(12) United States Patent
Fraser et al.

(10) Patent No.: US 11,738,409 B2
(45) Date of Patent: Aug. 29, 2023

(54) METAL WORKPIECES WITH SHOT BLAST RESISTANT IDENTIFIERS, METHODS AND SYSTEMS FOR LASER-MARKING SUCH IDENTIFIERS

(71) Applicant: LASERAX INC., Québec (CA)

(72) Inventors: Alex Fraser, Québec (CA); Julie Maltais, Québec (CA); Xavier Pruneau Godmaire, Saint-Lambert-de-Lauzon (CA); Jérôme Landry, Québec (CA); Jean-Michaël Deschenes, Lévis (CA)

(73) Assignee: LASERAX INC., Quebec (CA)

( * ) Notice: Subject to any disclaimer, the term of this patent is extended or adjusted under 35 U.S.C. 154(b) by 82 days.

(21) Appl. No.: 17/054,206

(22) PCT Filed: May 24, 2019

(86) PCT No.: PCT/CA2019/050707
§ 371 (c)(1),
(2) Date: Nov. 10, 2020

(87) PCT Pub. No.: WO2019/222855
PCT Pub. Date: Nov. 28, 2019

(65) Prior Publication Data
US 2021/0308798 A1    Oct. 7, 2021

Related U.S. Application Data

(60) Provisional application No. 62/745,009, filed on Oct. 12, 2018, provisional application No. 62/676,550, filed on May 25, 2018.

(51) Int. Cl.
*B23K 26/364* (2014.01)
*B41M 5/24* (2006.01)
*G06K 7/14* (2006.01)

(52) U.S. Cl.
CPC ............ *B23K 26/364* (2015.10); *B41M 5/24* (2013.01); *G06K 7/1408* (2013.01)

(58) Field of Classification Search
CPC ......... G06K 7/1408; B41M 5/26; B41M 5/24; B23K 26/362; B23K 26/364; G06V 2201/06; G06V 30/224
See application file for complete search history.

(56) References Cited

U.S. PATENT DOCUMENTS 5,632,916 A    5/1997  Lappalainen et al.
6,218,199 B1   4/2001  Sato
(Continued)

FOREIGN PATENT DOCUMENTS

DE    202016104447    9/2016
EP    3264336         1/2018
(Continued)

OTHER PUBLICATIONS

Alex Fraser, Review of technologies for identification of die casting parts, Sep. 30, 2016, Laserax Inc, 2811 avenue Watt, Quebec, QC, G1X 4S8, Canada. (Year: 2016).*

(Continued)

*Primary Examiner* — Dana Ross
*Assistant Examiner* — Kuangyue Chen
(74) *Attorney, Agent, or Firm* — Reno Lessard; Norton Rose Fulbright Canada LLP

(57) ABSTRACT

There is described a metal workpiece generally having a surface and an identifier marked on said surface. The identifier has cells each having a corresponding cell size, including bright cells corresponding to a first binary value and dark cells corresponding to a second binary value different from the first binary value. The dark cells include a center portion being recessed relative to the surface thereby leaving a recess bounded by a peripheral wall in the corresponding (Continued)

dark cell, the recess having a depth of at least 100 microns and having an opening with a width ranging between 400 microns and 1750 microns and representing between 30 percent and 99 percent of the corresponding cell size such that the corresponding dark cell appears dark to an optical reader. The depth, the width and the cell size of the dark cells provide a shot blast resistance to the laser-marked identifier.

14 Claims, 32 Drawing Sheets

(56) References Cited

U.S. PATENT DOCUMENTS

| | | |
|---|---|---|
| 7,424,975 B2 | 9/2008 | Cordery et al. |
| 7,594,613 B2 | 9/2009 | Sato et al. |
| 8,389,895 B2 | 3/2013 | Reichenbach et al. |
| 8,492,240 B2 | 7/2013 | Mueller et al. |
| 9,001,172 B2 | 4/2015 | Ghauri |
| 9,186,924 B2 | 11/2015 | Lewis |
| 9,269,035 B2 | 2/2016 | Redd |
| 2016/0034805 A1 | 2/2016 | Ramsey |
| 2016/0332772 A1 | 11/2016 | Ramsey |
| 2017/0252867 A1 | 9/2017 | Bach et al. |
| 2017/0351887 A1 | 12/2017 | Ha et al. |
| 2018/0065402 A1 | 3/2018 | Walker et al. |

FOREIGN PATENT DOCUMENTS

| | | |
|---|---|---|
| JP | 2015005549 A | 1/2015 |
| WO | 2016103288 A1 | 6/2016 |

OTHER PUBLICATIONS

J.F. Desmeules, B. Côté and J.D. Dufour, Semi Finished Products Traceability Improvement with Laser Marking, The Minerals, Metals & Materials Society, pp. 1069-1077, Light Metals 2017.

Sara Dudzinska, Emilia Bachtiak-Radka, Daniel Grochala, Stefan Berczynski, A study on technological properties of metallic surfaces marked with data matrix codes with laser technology, Journal of Machine Construction and Maintenance, p. 91-101, 2018.

Alex Fraser, Vincent Brochu, Daniel Gingras and Xavier P. Godmaire, Important considerations for laser marking an identifier on aluminum, The Mineral, Metals & Materials Society, pp. 261-264, Light Metals 2016.

Alex Fraser, Review of technologies for identification of die casting parts.

Adelina Han, Dinu Gubencu, Analysis of the laser marking technologies, Nonconventional Technologies Review, No. 4, 2008.

Alex Fraser, Martin Hartlieb, Traceability and Laser Marking of Die Castings, Die Casting Engineer, Jan. 2018.

Julie Maltais, Vincent Brochu, Clément Frayssinous, Réal Vallée, Xavier Godmaire and Alex Fraser, Surface Analysis Study of Laser Marking of Aluminum.

Krystian L. Wlodarczyk, Marcus Ardron, Andrew J. Waddie, Andrew Dunn, Matthew D. Kidd, Nicholas J. Weston, Duncan P. Hand, Laser microsculpting for the generation of robust diffractive security markings on the surface of metals, Journal of Materials Processing Technology, p. 206-218, Mar. 2015.

\* cited by examiner

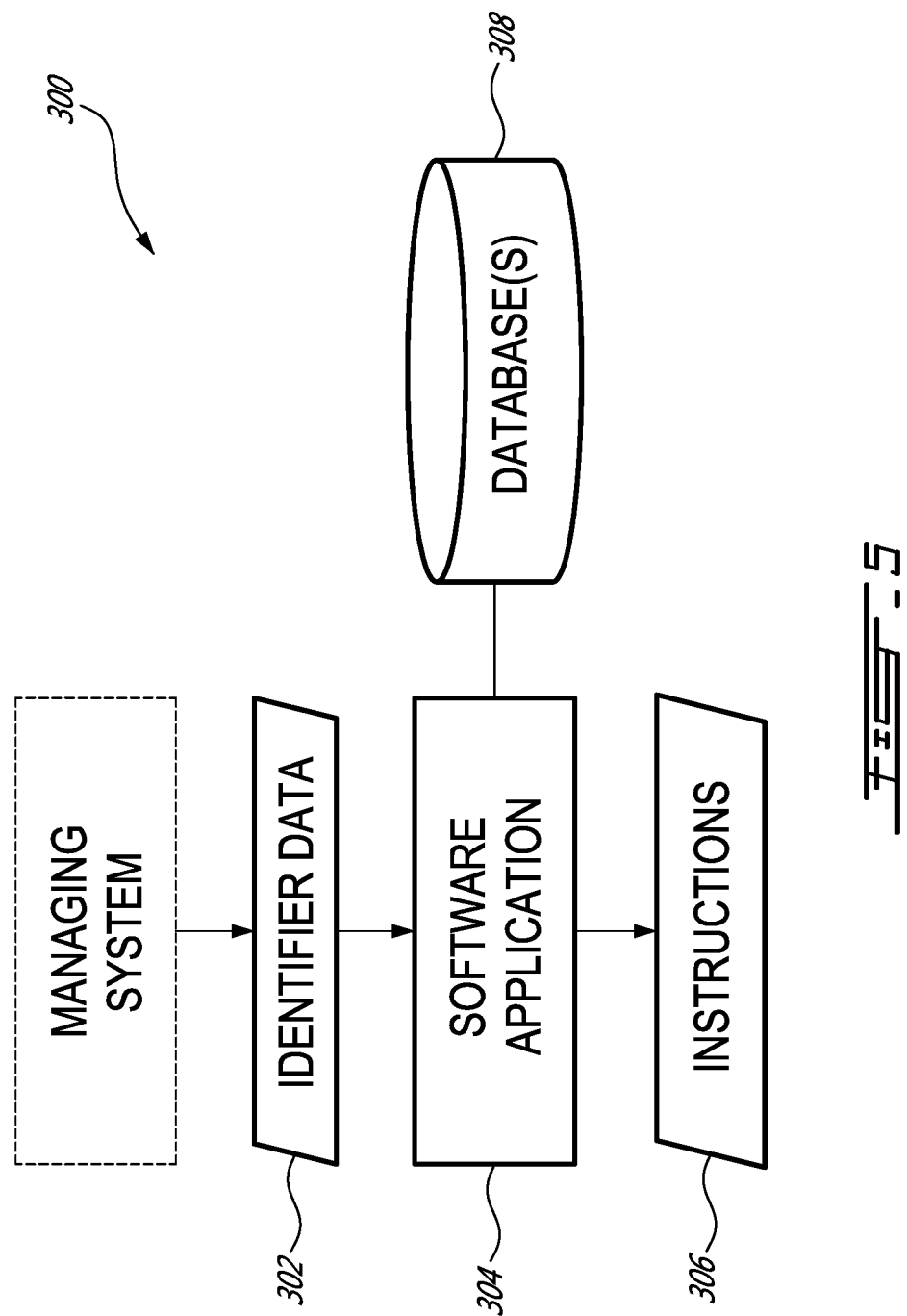

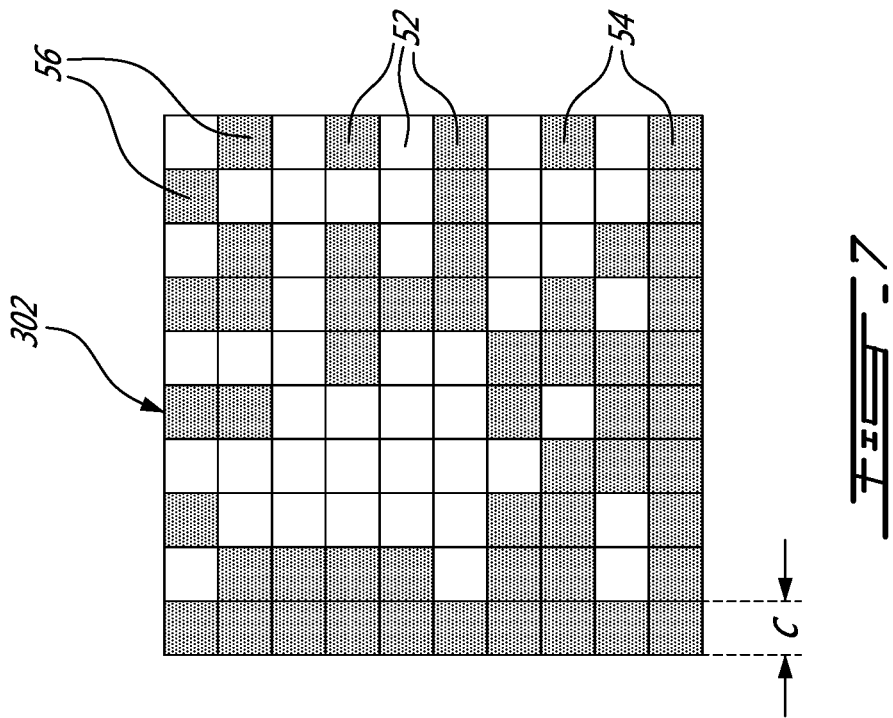

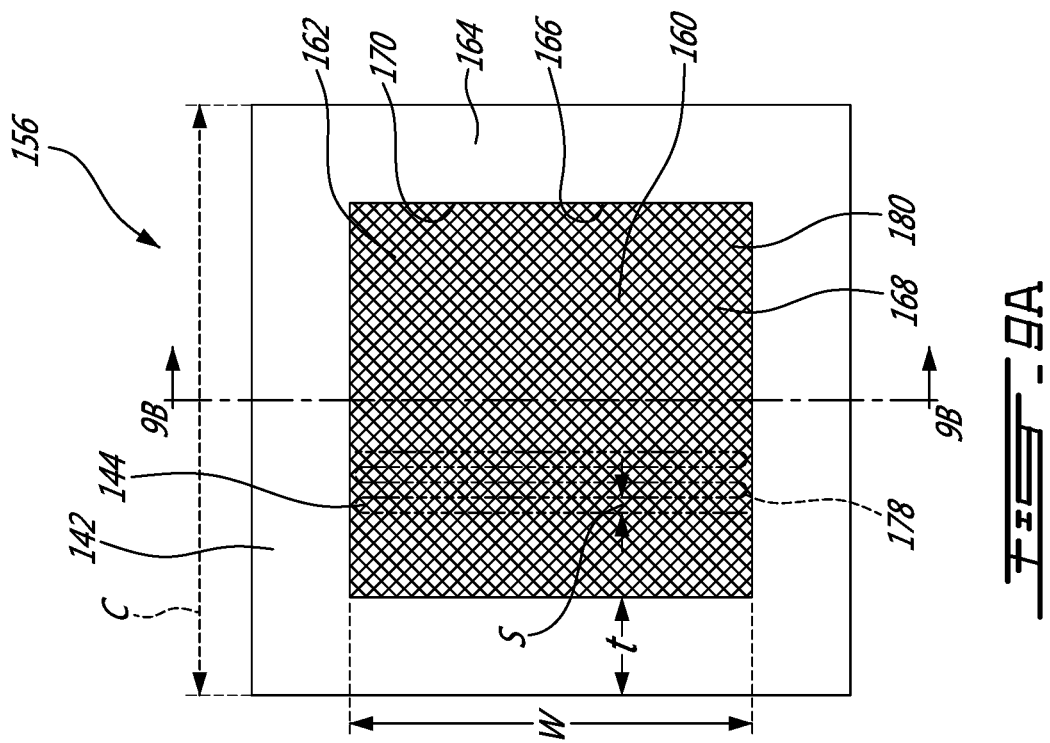
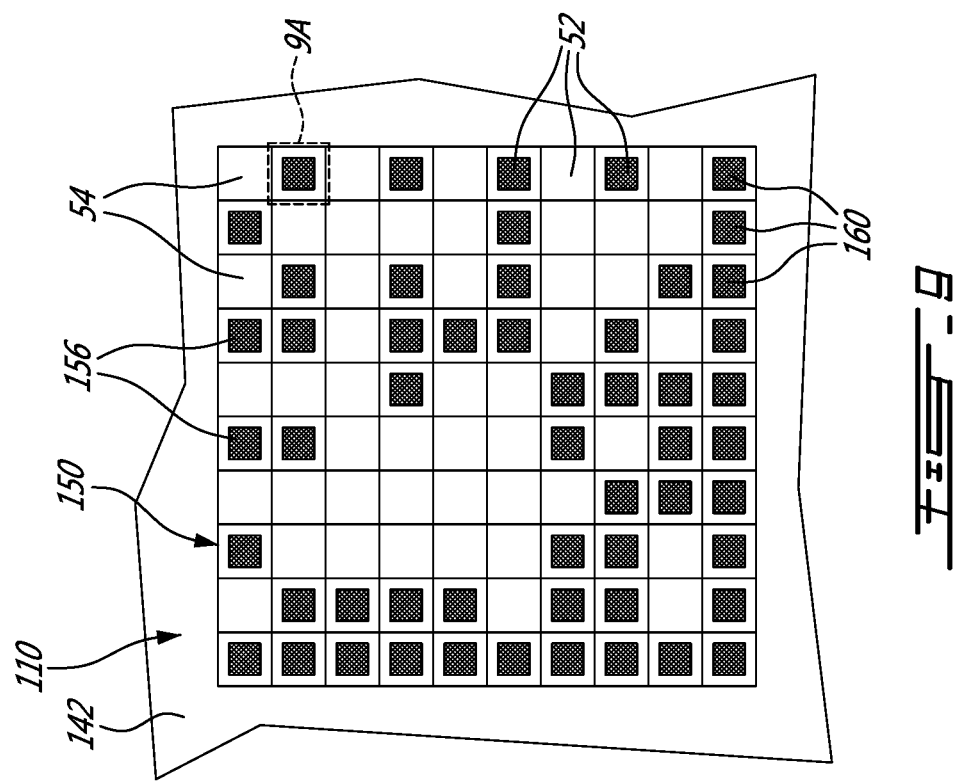

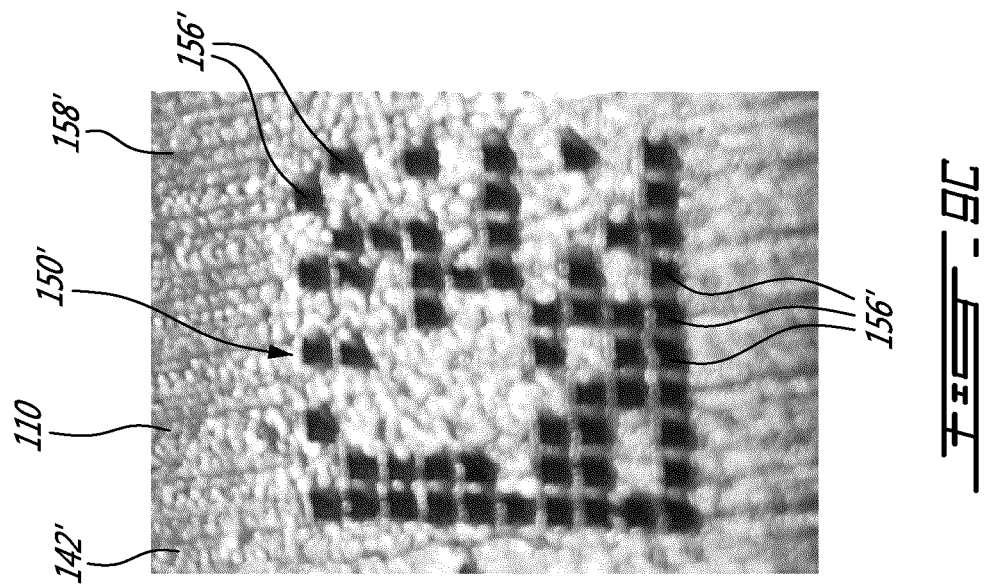
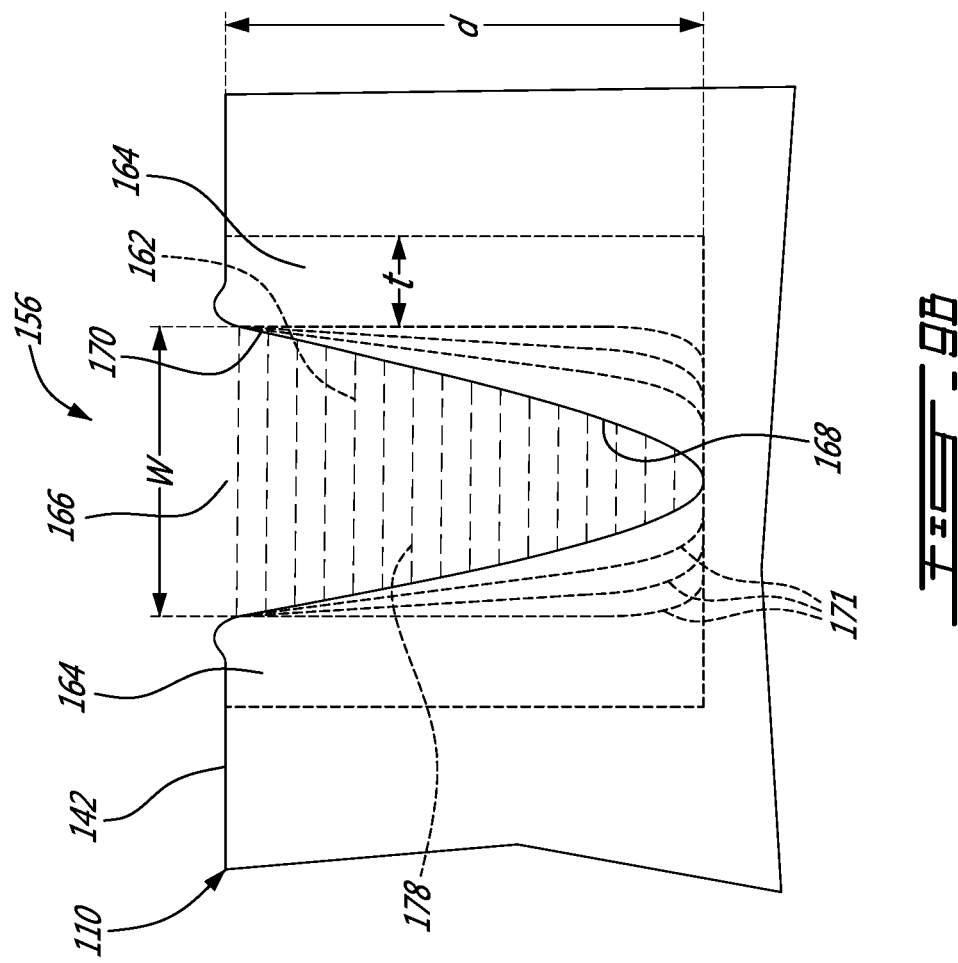

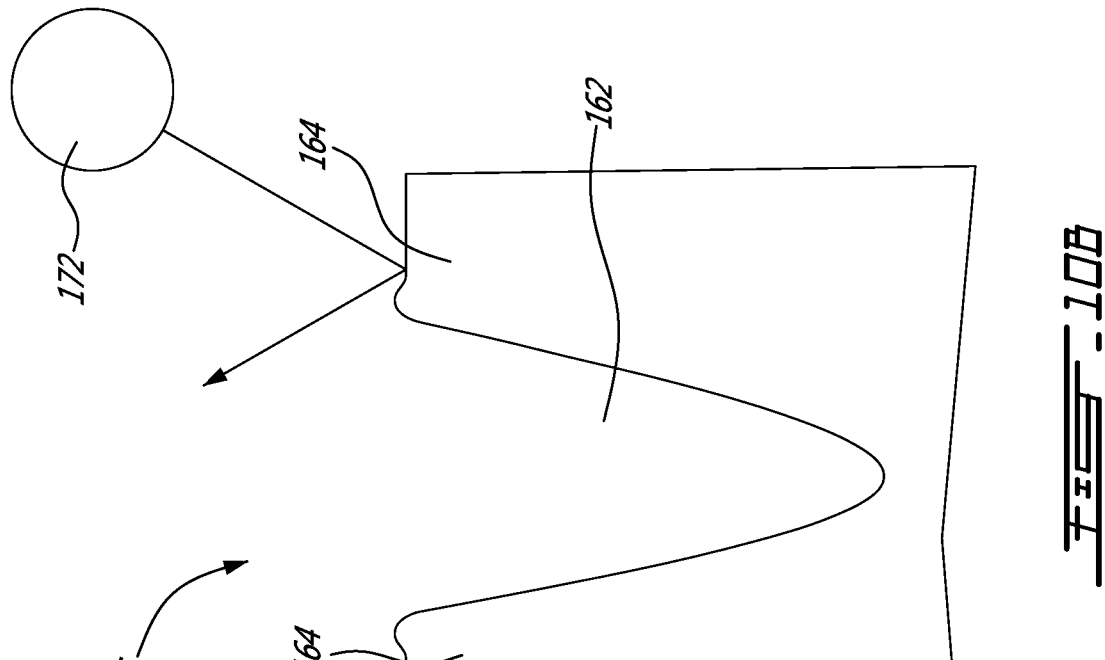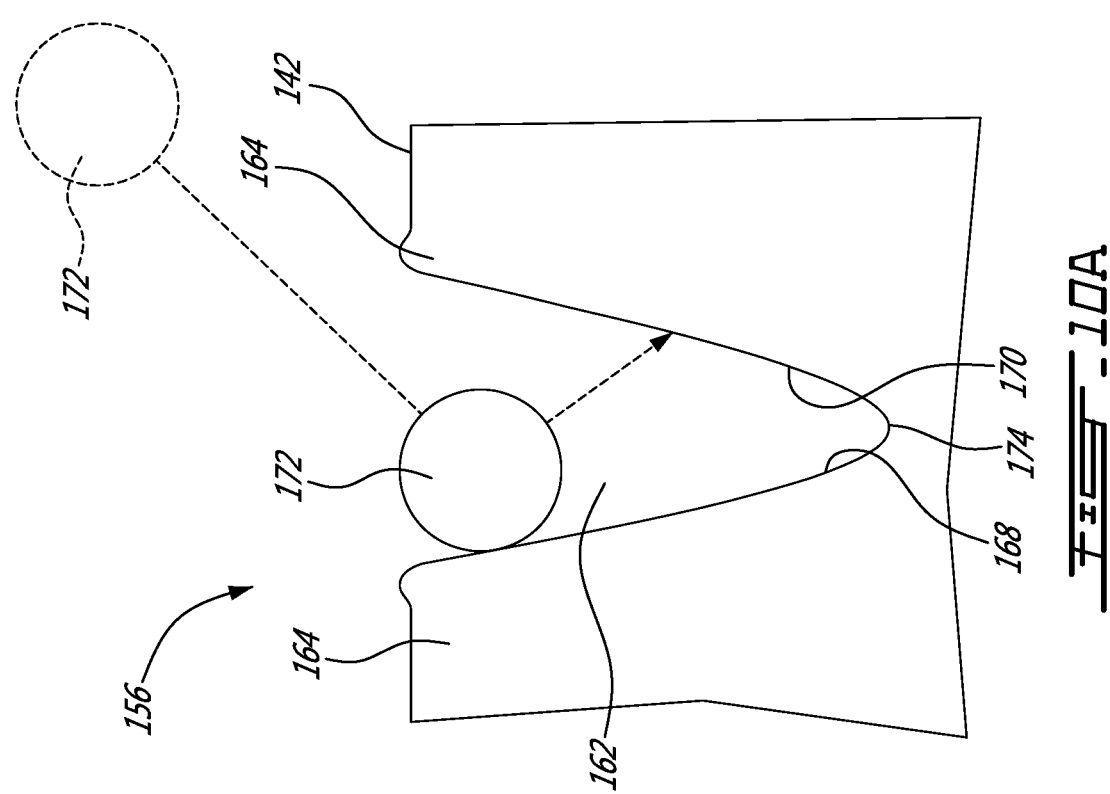

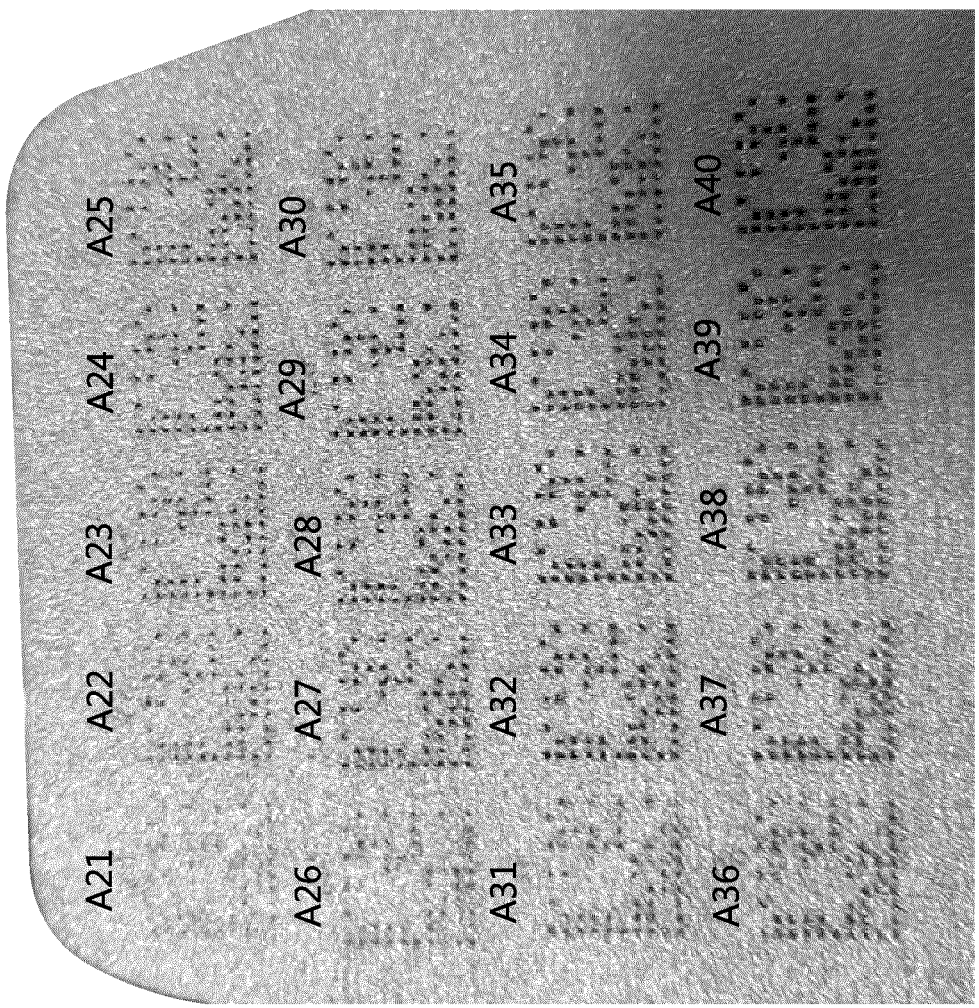

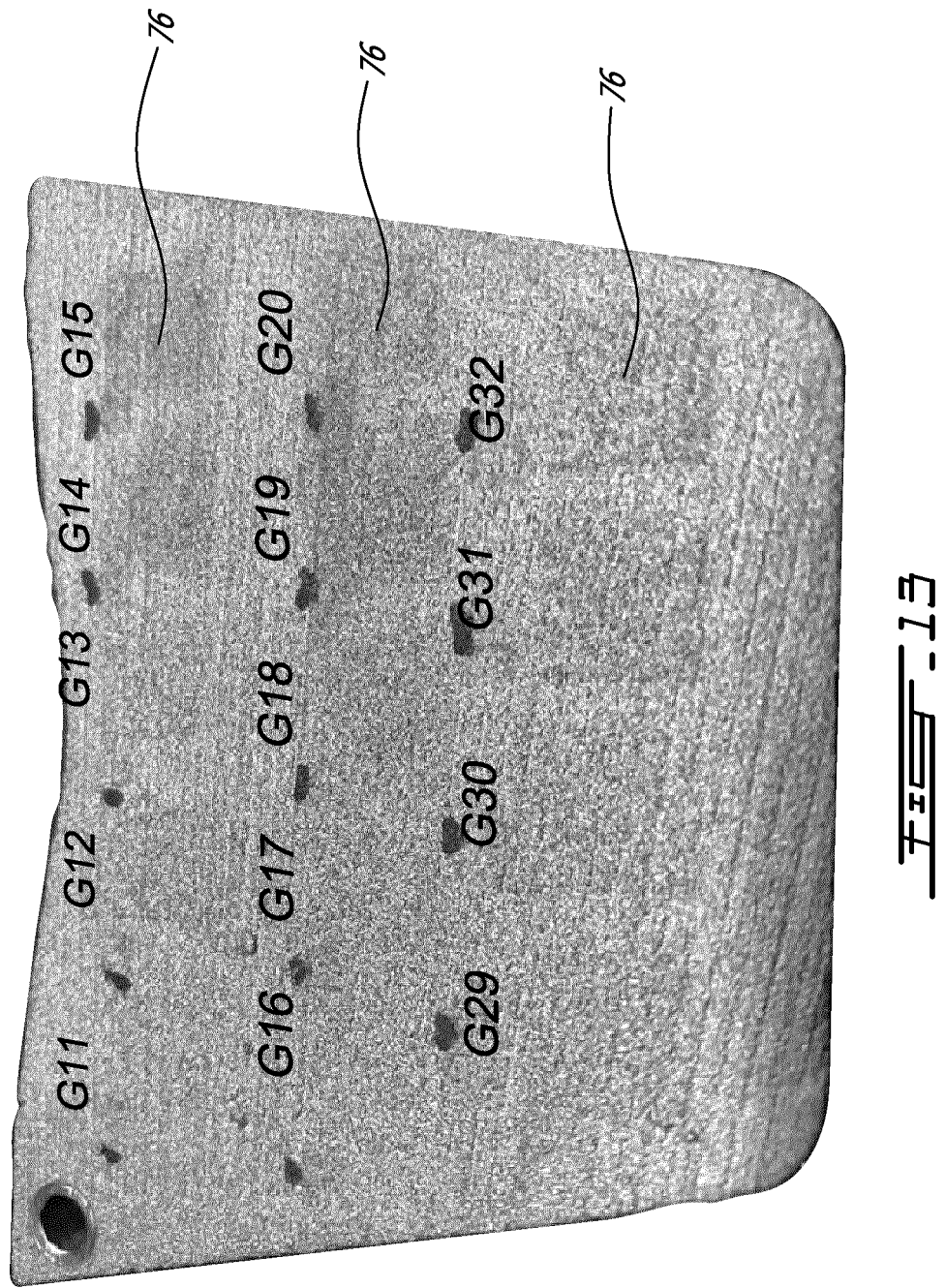

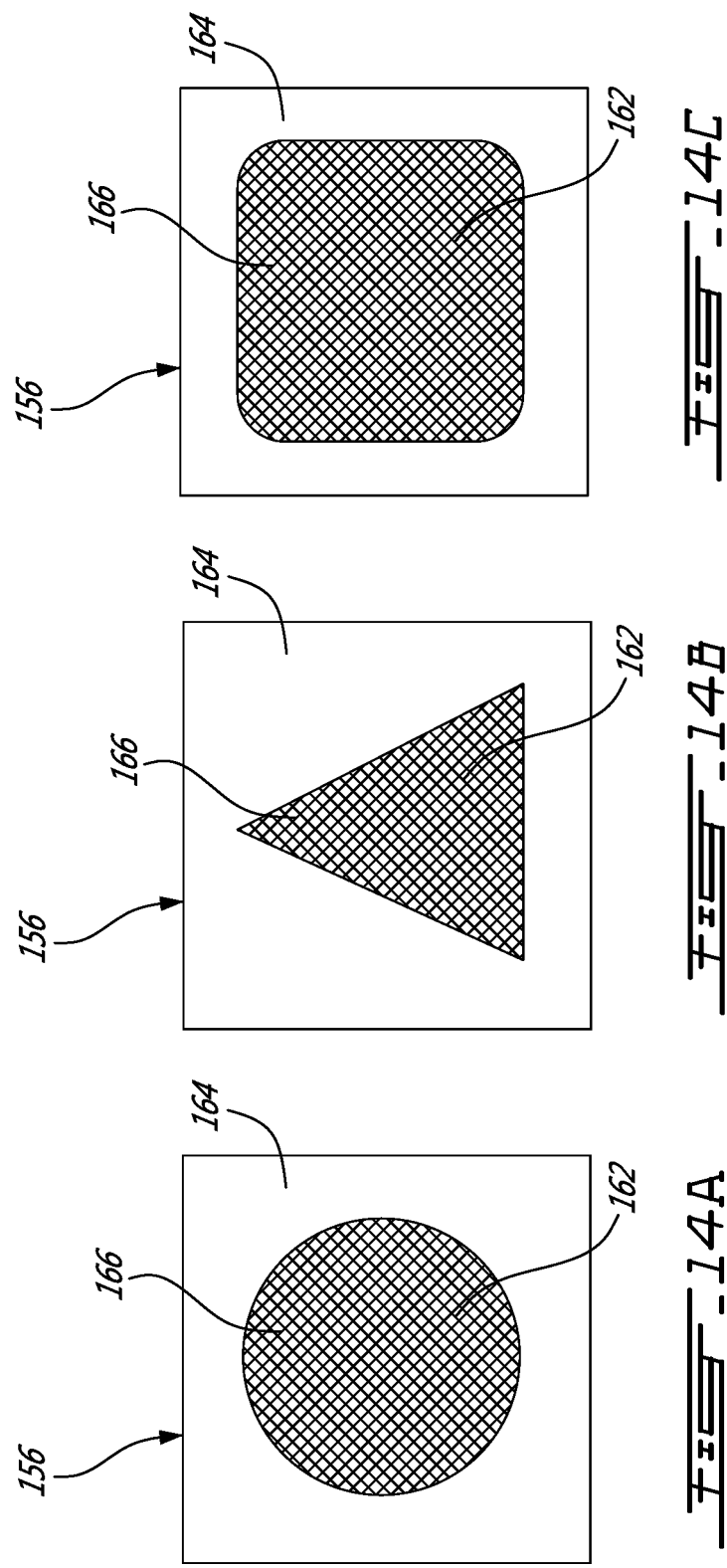

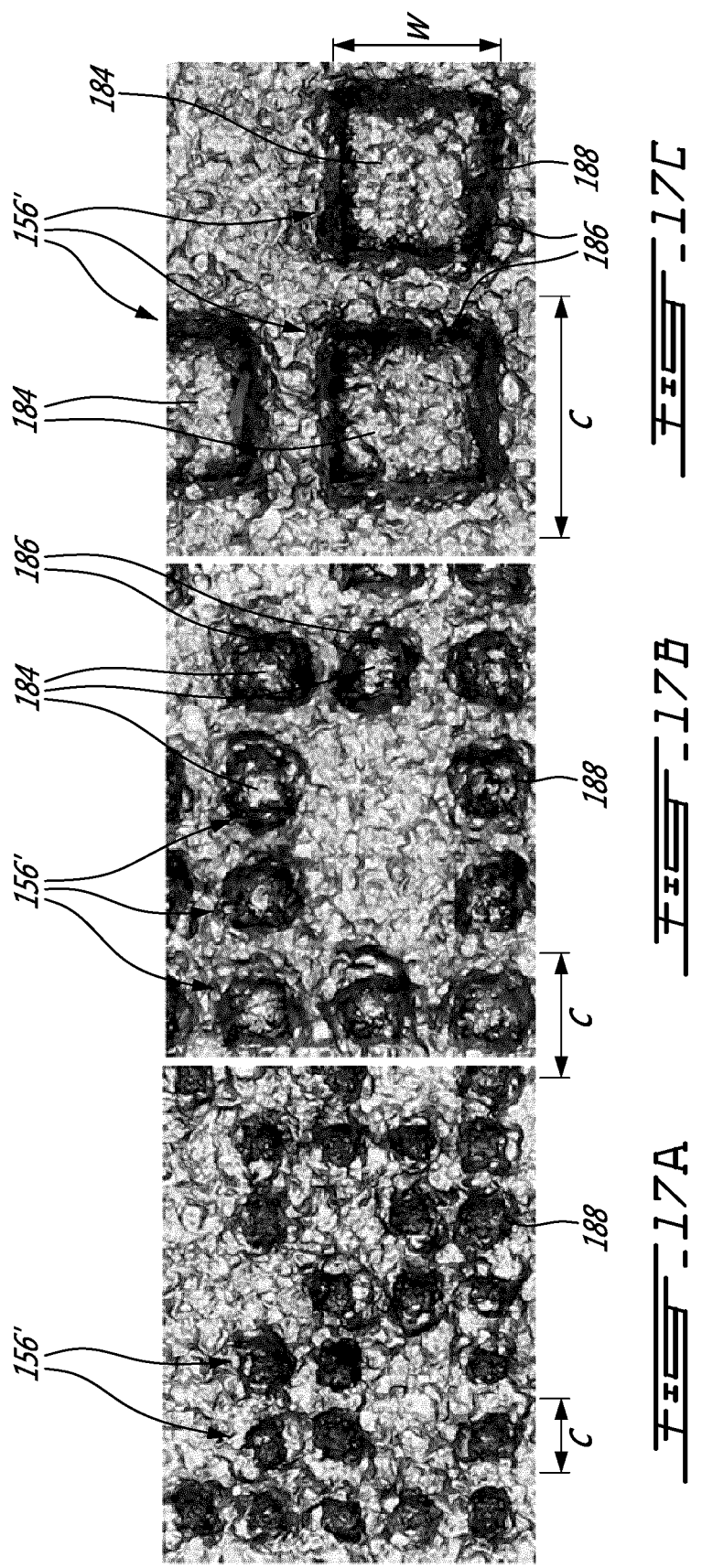

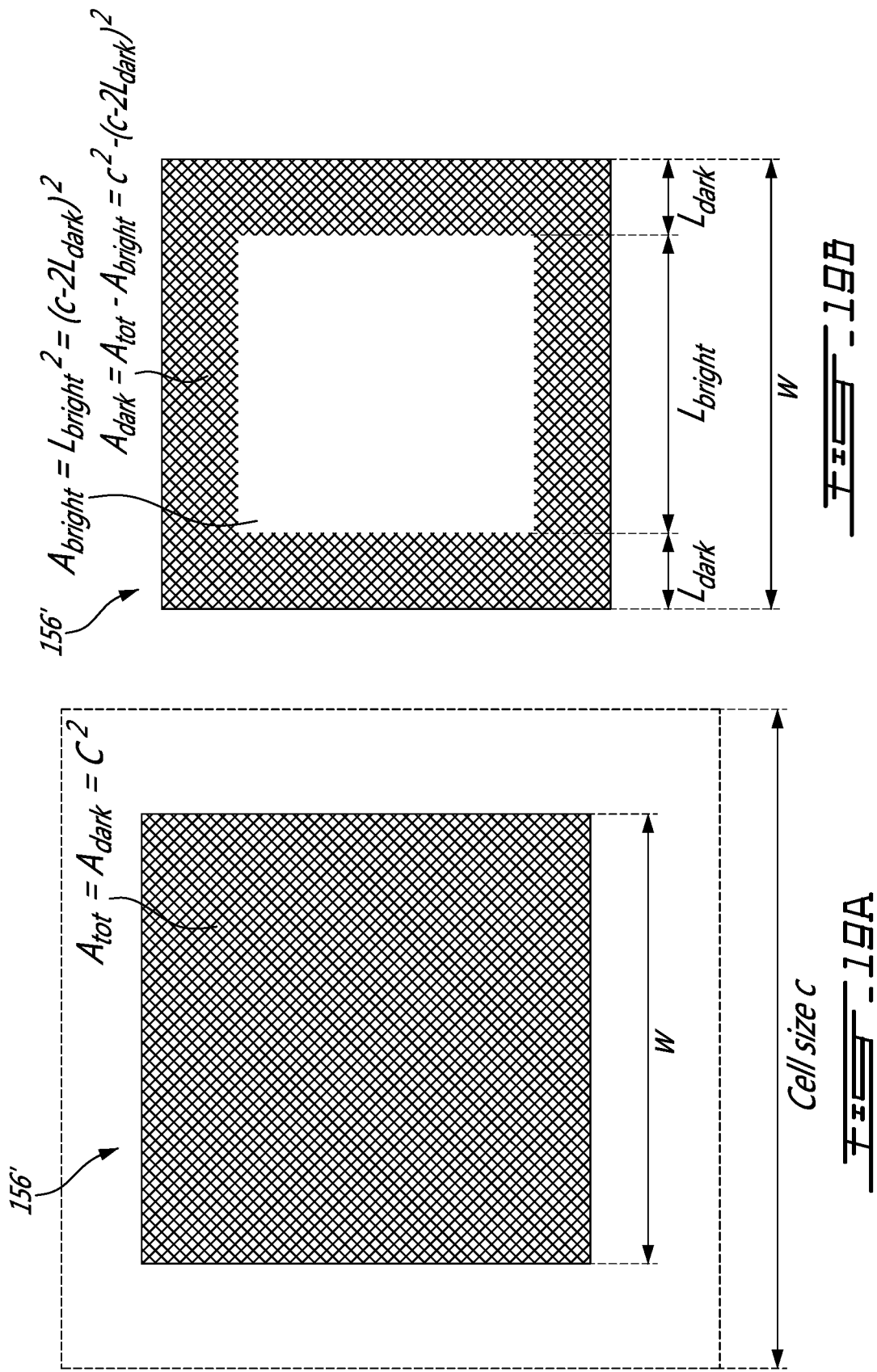

METAL WORKPIECES WITH SHOT BLAST RESISTANT IDENTIFIERS, METHODS AND SYSTEMS FOR LASER-MARKING SUCH IDENTIFIERS

CROSS-REFERENCE TO RELATED APPLICATIONS

This application claims priority of both U.S. Provisional Patent Application Ser. No. 62/676,550 filed on May 25, 2018 and U.S. Provisional Patent Application Ser. No. 62/745,009 filed on Oct. 12, 2018, the entire contents of each of which are incorporated herein by reference.

FIELD

The improvements generally relate to marking metal workpieces and more specifically relate to laser marking shot-blast resistant identifiers on such metal workpieces.

BACKGROUND

Metal workpieces can be produced by a multitude of different techniques, including casting or forging to name a few examples. For instance, generally referring to FIG. 1, die-casting generally involves forcing molten metal under high pressure into a mold cavity to form metal castings 10 using a die-casting station 12. Typically, the mold cavity has two hardened tool steel dies which have been machined into a desired shape. When a metal casting 10 is made, one of the steel dies is moved away, leaving the metal casting 10 in the other one of the steel dies, from which the casting 10 can be ejected.

As depicted, the ejected metal casting 10 is manipulated using a robot arm 14 so as to move it away from the die-casting station 12 for further transformation along a production line 16. Such production line 16 can include a trimming station 18 where the metal castings 10 are trimmed, a shot-blasting station 20 where the metal castings 10 are shot-blasted, a machining station 22 where the metal castings 10 are machined, and an identification station 24 where the metal castings 10 are identified usually at high temperature, after which the transformed metal castings 10 can be distributed.

Identification of the metal castings 10 along the production line 16 allows, in case of a failure of one of the metal castings 10 at some point along the transformation and distribution chain, to track down the cause of the failure and to react accordingly. Although existing techniques for identifying metal castings or other metal workpieces were satisfactory to a certain degree, there remains room for improvement.

SUMMARY

Identifying the metal castings 10 as early as possible along the production line 16 can contribute to avoid identification errors, which can happen when the metal castings 10 are manipulated between the die-casting station 12 and the identification station 24. Moreover, it appears that the probability of a given metal casting 10 being erroneously identified increases with the number of manipulations of that given metal casting 10 between the die-casting station 12 and the identification station 24. For instance, in the production line 16, once ejected from one of the steel dies, the metal casting 10 is often transformed in the following order: the metal casting is manipulated from the die-casting station 12 to the trimming station 18; the metal casting 10 is manipulated from the trimming station 18 to the shot-blasting station 20; the metal casting 10 is manipulated from the shot-blasting station 20 to the machining station 22; the metal casting 10 is manipulated from the machining station 22 to the identification station 24 where the metal casting 10 is identified with a dedicated identifier such as a data matrix.

Accordingly, in this example, a given metal casting 10 is manipulated at least three times between the die-casting station 12 and the identification station 24. During these manipulations, the given metal casting 10 may be substituted with another casting 10 in which case one or more metal castings 10 could be erroneously identified, i.e., a given metal casting 10 is identified with an identifier which belong to another, different metal casting 10 instead. In these situations, the accuracy with which the metal castings 10 can be tracked along the transformation and distribution chain can thus be compromised.

As such, to identify a metal casting as early as possible along a production line, the metal casting should preferably be identified with a dedicated identifier as the metal casting still lies in one of the steel dies of the die-casting station, as the robot arm manipulates the metal casting away from one of the steel dies of the die-casting station and/or using an identification station immediately subsequent to the die-casting station. However, proceeding accordingly was generally not advisable in production lines including a subsequent shot blasting station, which could damage and even erase the previously-marked identifier. Accordingly, the inventors describe herein methods and systems for laser-marking shot blast resistant identifiers, which can allow identification of the metal castings as soon as possible in the production line and which can still be readable even after being shot-blasted. In any case, the identifier should preferably be marked using a laser-marking system to benefit from the precision and efficiency of such systems. Metal castings bearing such shot blast resistant identifiers are also described.

There is thus a need for laser-marking shot-blast resistant identifiers on metal castings or any other metal workpieces.

In accordance with one aspect, there is provided a method of laser-marking shot blast resistant identifiers on metal workpieces along a production line, the method comprising: receiving a metal workpiece along the production line; obtaining identifier data indicative of an identifier to be laser-marked on the received metal workpiece, the identifier having a plurality of cells each having a corresponding cell size, the plurality of cells having a plurality of bright cells corresponding to a first binary value and a plurality of dark cells corresponding to a second binary value; and based on the identifier data, laser-marking the identifier on a surface of the received metal workpiece by laser-removing, for each one of the plurality of dark cells, metal from the surface of the metal workpiece only at a center portion of the corresponding dark cell thereby leaving a recess bounded by a peripheral wall in the corresponding dark cell, the recess having a depth of at least 100 microns and having an opening with a width ranging between 400 microns and 1750 microns and representing between 30 percent and below 99 percent of the corresponding cell size such that the corresponding dark cell appears dark to an optical reader, the depth, the width and the corresponding cell size of the corresponding dark cell providing a shot blast resistance to the laser-marked identifier.

In accordance with another aspect, there is provided a system for laser-marking shot blast resistant identifiers on metal workpieces along a production line, the system comprising: a laser-marking system configured to generate a laser-marking beam and being controllable using a controller configured for performing the steps of: obtaining identifier data indicative of an identifier to be laser-marked on a metal workpiece using the laser-marking beam, the identifier having a plurality of cells each having a corresponding cell size, the plurality of cells having a plurality of bright cells corresponding to a first binary value and a plurality of dark cells corresponding to a second binary value; and based on the identifier data, transmitting instructions for laser-marking the identifier on a surface of the metal workpiece by laser-removing, for each one of the plurality of dark cells, metal from the surface of the metal workpiece only at a center portion of the corresponding dark cell thereby leaving a recess bounded by a peripheral wall in the corresponding dark cell, the recess having a depth of at least 100 microns and having an opening with a width ranging between 400 microns and 1750 microns and representing between 30 percent and 99 percent of the corresponding cell size such that the corresponding dark cell appears dark to an optical reader, the depth, the width and the corresponding cell size of the corresponding dark cell providing a shot blast resistance to the laser-marked identifier.

In accordance with another aspect, there is provided a metal workpiece comprising a surface and an identifier marked on said surface, the identifier having a plurality of cells each having a corresponding cell size, the identifier having a plurality of bright cells corresponding to a first binary value and a plurality of dark cells corresponding to a second binary value different from the first binary value, wherein each one of the plurality of dark cells includes a center portion being recessed relative to the surface thereby leaving a recess bounded by a peripheral wall in the corresponding dark cell, the recess having a depth of at least 100 microns and having an opening with a width ranging between 400 microns and 1750 microns and representing between 30 percent and 99 percent of the corresponding cell size such that the corresponding dark cell appears dark to an optical reader, the depth, the width and the corresponding cell size of the corresponding dark cell providing a shot blast resistance to the laser-marked identifier.

In accordance with another aspect, there is provided a metal workpiece comprising a surface and an identifier marked on said surface, the identifier having a plurality of cells each having a corresponding cell size, the identifier having a plurality of bright cells corresponding to a first binary value and a plurality of dark cells corresponding to a second binary value different from the first binary value, wherein each one of the plurality of dark cells includes a center portion being recessed relative to the surface thereby leaving a recess bounded by a peripheral wall in the corresponding dark cell, the depth, the width and the corresponding cell size of the corresponding dark cell providing a shot blast resistance to the laser-marked identifier. In some embodiments, the width ranges between 400 microns and 1750 microns, preferably between 600 microns and 850 microns such that the corresponding dark cell appears dark to an optical reader. In some embodiments, each recess has a depth of at least 100 microns, preferably at least 150 microns, and most preferably above 300 microns. In some other embodiments, the width of the opening of each recess ranges between 30 percent and 99 percent of the corresponding cell size, preferably between 60 and 95 percent of the corresponding cell size and most preferably between 70 and 89 percent of the corresponding cell size.

In accordance with another aspect, there is provided a method of laser-marking shot blast resistant identifiers on metal workpieces along a production line, the method comprising: receiving a metal workpiece along the production line; and based on previously obtained identifier data, laser marking an identifier on a surface of said metal workpiece, said identifier having a plurality of cells each having a corresponding cell size c, the plurality of cells having a plurality of bright cells corresponding to a first binary value and a plurality of dark cells corresponding to a second binary value; said laser marking comprising removing, for each one of the plurality of dark cells, metal from the surface of the metal workpiece only at a center portion of the corresponding dark cell thereby leaving a recess bounded by a peripheral wall in the corresponding dark cell, the recess having a bottom wall with a width w at a depth d which are such that a ratio R of a dark area of said bottom wall to a total area of said bottom wall exceeds about 50%, said dark area defining an area of said bottom wall being unreachable by a shot having a diameter D.

In accordance with another aspect, there is provided a system for laser-marking shot blast resistant identifiers on metal workpieces along a production line, the system comprising: a laser-marking system configured to generate a laser-marking beam and being controllable using a controller configured for performing the steps of: receiving a metal workpiece along the production line; and based on previously obtained identifier data, laser marking an identifier on a surface of said metal workpiece, said identifier having a plurality of cells each having a corresponding cell size c, the plurality of cells having a plurality of bright cells corresponding to a first binary value and a plurality of dark cells corresponding to a second binary value; said laser marking comprising removing, for each one of the plurality of dark cells, metal from the surface of the metal workpiece only at a center portion of the corresponding dark cell thereby leaving a recess bounded by a peripheral wall in the corresponding dark cell, the recess having a bottom wall with a width w at a depth d which are such that a ratio R of a dark area of said bottom wall to a total area of said bottom wall exceeds about 50%, said dark area defining an area of said bottom wall being unreachable by a shot having a diameter D.

In accordance with another aspect, there is provided a metal workpiece comprising a surface and an identifier marked on said surface, the identifier having a plurality of cells each having a corresponding cell size, the identifier having a plurality of bright cells corresponding to a first binary value and a plurality of dark cells corresponding to a second binary value different from the first binary value, wherein each one of the plurality of dark cells includes a center portion being recessed relative to the surface thereby leaving a recess bounded by a peripheral wall in the corresponding dark cell, the recess having a bottom wall with a width w at a depth d which are such that a ratio R of a dark area of said bottom wall to a total area of said bottom wall exceeds about 50%, said dark area defining an area of said bottom wall being unreachable by a shot having a diameter D. In some embodiments, the width ranges between 400 microns and 1750 microns, and preferably between 600 microns and 850 microns. In some embodiments, each recess has a depth of at least 100 microns, preferably at least 150 microns, and most preferably above 300 microns. In some other embodiments, the width of the opening of each recess ranges between 30 percent and 99 percent of the corresponding cell size, preferably between 60 and 95 percent of the corresponding cell size and most preferably between 70 and 89 percent of the corresponding cell size. In some embodiments, an aspect ratio of the depth relative to the width ranges between 0.2 and 2, and preferably between 0.3 and 1.5. The identifier can be provided in the form of a data matrix. The shape of the opening can have a rectangular shape.

It will be understood that the expression "computer" as used herein is not to be interpreted in a limiting manner. It is rather used in a broad sense to generally refer to the combination of some form of one or more processing units and some form of memory system accessible by the processing unit(s). Similarly, the expression "controller" as used herein is not to be interpreted in a limiting manner but rather in a general sense of a device, or of a system having more than one device, performing the function(s) of controlling one or more device such as an electronic device for instance.

It will be understood that the various functions of a computer or of a controller can be performed by hardware or by a combination of both hardware and software. For example, hardware can include logic gates included as part of a silicon chip of the processor. Software can be in the form of data such as computer-readable instructions stored in the memory system. With respect to a computer, a controller, a processing unit, or a processor chip, the expression "configured to" relates to the presence of hardware or a combination of hardware and software which is operable to perform the associated functions.

Many further features and combinations thereof concerning the present improvements will appear to those skilled in the art following a reading of the instant disclosure.

DESCRIPTION OF THE FIGURES

In the figures,

FIG. 5 is a schematic view of an example of a software application of the controller of FIG. 3, in accordance with one or more embodiments;

FIG. 6 is a schematic view of example identification data being indicative of an identifier, provided in the form of a data matrix including first and second binary values, in accordance with one or more embodiments;

FIG. 7 is a schematic view of another example of identification data being indicative of an identifier, provided in the form of a data matrix including dark and bright cells, in accordance with one or more embodiments;

FIG. 9 is a schematic view of a metal casting having a shot blast resistant identifier marked on a surface thereof, shown prior to shot blasting, in accordance with one or more embodiments;

FIG. 9A is a schematic view of a dark cell of the shot blast resistant identifier of FIG. 9, in accordance with one or more embodiments;

FIG. 9B is a sectional view of the dark cell of FIG. 9A, taken along line 9B-9B of FIG. 9A, in accordance with one or more embodiments;

FIG. 9C is a schematic view of the shot blast resistant identifier of the metal casting of FIG. 9, shown after shot blasting, in accordance with one or more embodiments;

FIG. 10A is a sectional view of a dark cell of FIG. 9A, showing a shot bouncing on an inside surface of a peripheral wall of a recess of the dark cell, in accordance with one or more embodiments;

FIG. 10B is a sectional view of a dark cell of FIG. 9A, showing a shot bouncing on a top surface of the peripheral wall of the recess of the dark cell, in accordance with one or more embodiments;

FIGS. 11A-L are top elevation views of metal workpieces having a plurality of shot blast resistant identifiers laser-marked on a surface thereof, shown after shot blasting, in accordance with some embodiments;

FIG. 13 is a schematic view of a metal casting having laser-marked thereon a plurality of identifiers lacking a shot blast resistance, shown after shot blasting, in accordance with some embodiments;

FIG. 14A is a schematic view of an example of a dark cell, showing an opening having a circular shape, in accordance with one or more embodiments;

FIG. 14B is a schematic view of an example of a dark cell, showing an opening having a triangular shape, in accordance with one or more embodiments;

FIG. 14C is a schematic view of an example of a dark cell, showing an opening having a rounded corners square shape, in accordance with one or more embodiments;

FIGS. 17A, 17B and 17C are top elevation views of metal workpieces having dark cells inscribed therein, having recesses of widths w of 0.5 mm, 0.75 mm and 1.6 mm, respectively, at a depth d of 0.60 mm, shown after shot blasting with shots of average diameters D of 0.430 mm, in accordance with one or more embodiments;

FIG. 19A is a top elevation view of the dark cell of FIG. 18A or 18D, in accordance with one or more embodiments; and FIG. 19B is a top elevation view of the dark cell of FIG. 18B or 18C, in accordance with one or more embodiments.

DETAILED DESCRIPTION

Figure 1:
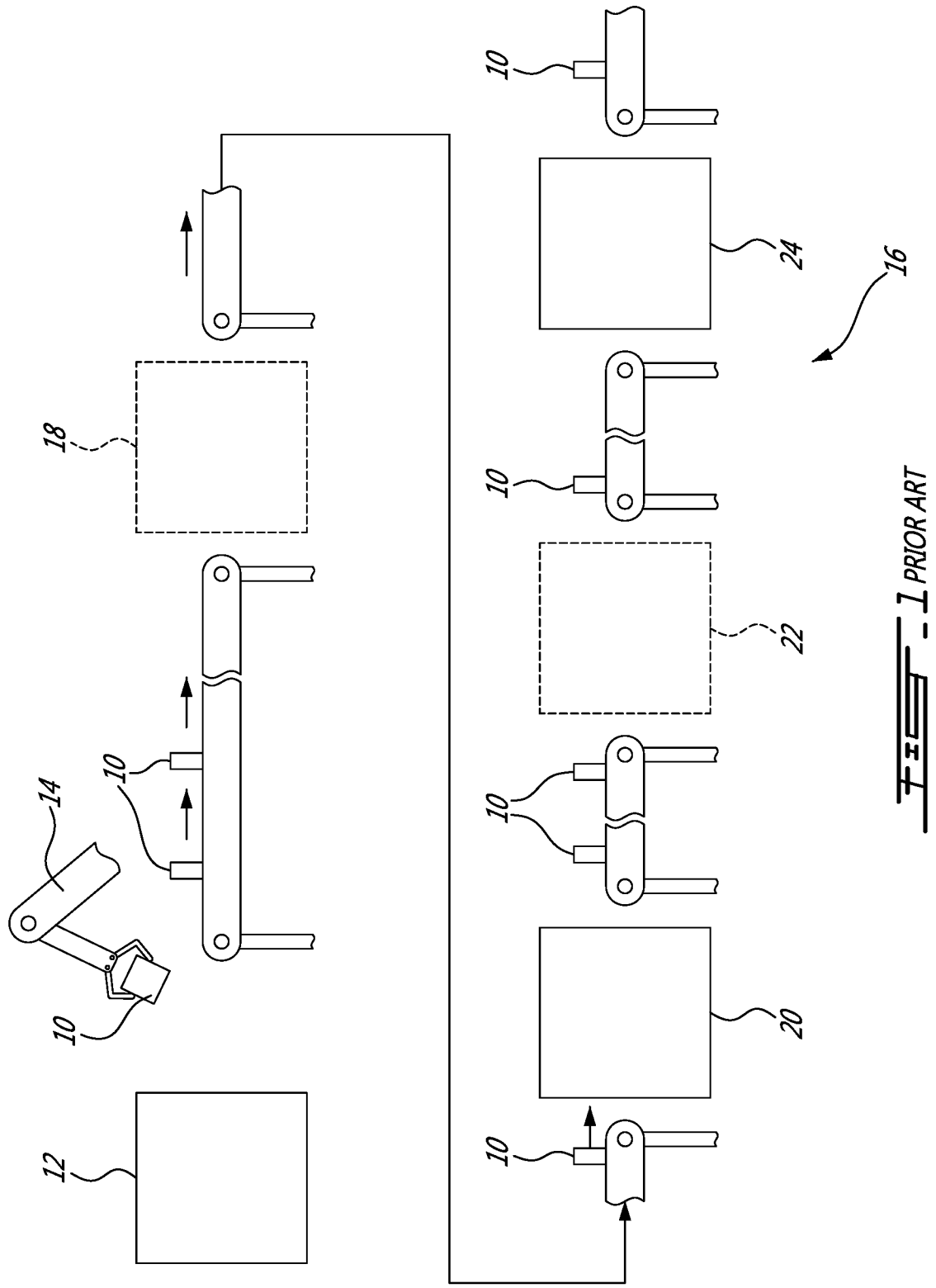
FIG. 1 is a schematic view of an example production line, with an identification station being downstream from a shot blasting station, in accordance with the prior art.
Figure 2:
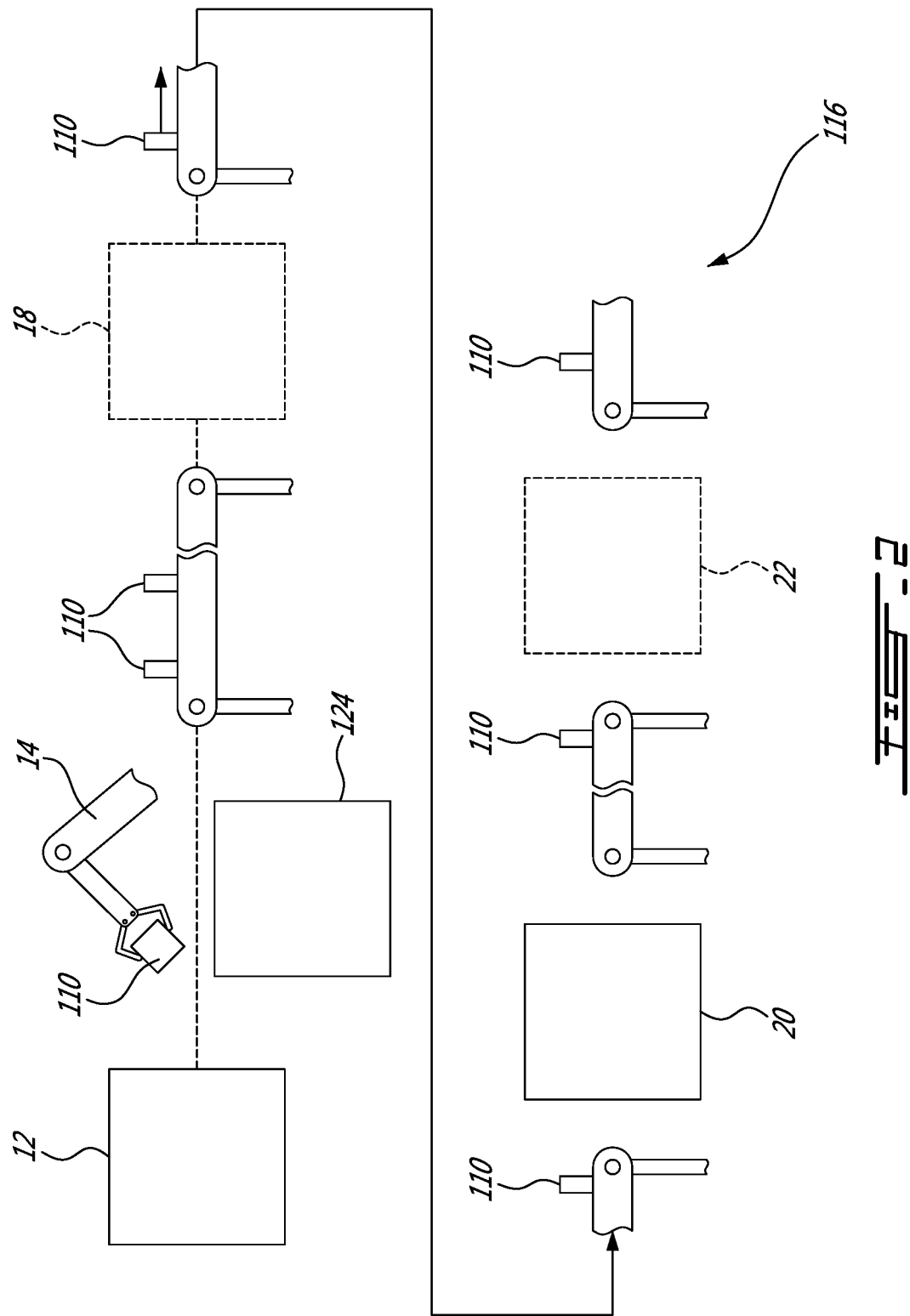
FIG. 2 is a schematic view of an example of a production line, with an identification station being upstream from a shot blasting station, in accordance with one or more embodiments.

Referring now to FIG. 2, this disclosure relates to identifying a metal workpiece such as a metal casting 110 as early as possible along the production line 116. As shown, the metal casting 110 should preferably be identified with a dedicated identifier as the metal casting 110 lies in the die-casting station 12, as a robot arm 14 manipulates the metal casting 110 away from one of the steel dies of the die-casting station 12 and/or using an identification station 124 which is positioned immediately subsequent to the die-casting station 12.

Figure 3:
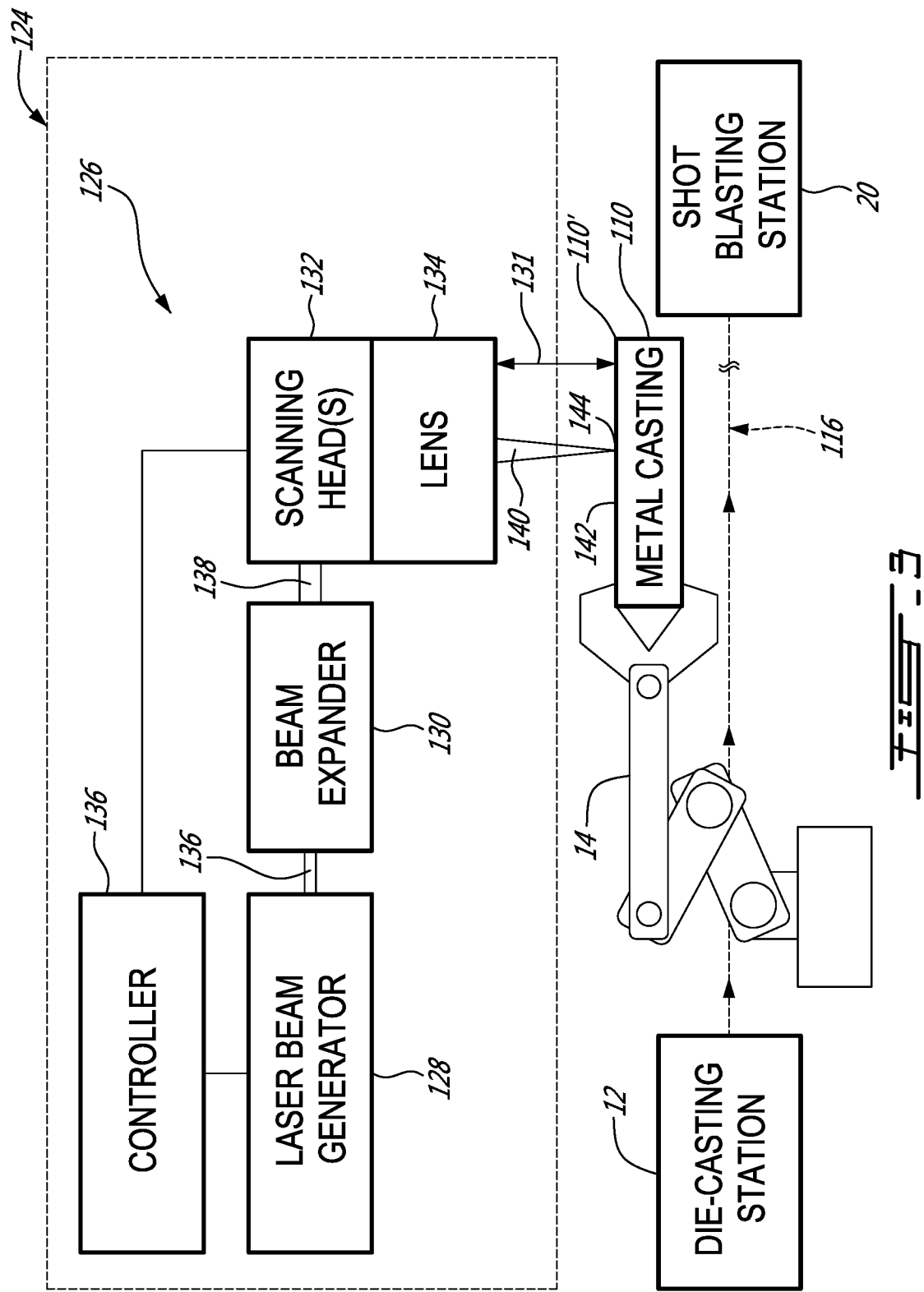
FIG. 3 is a schematic view of an example of the identification station of FIG. 2, showing a laser-marking system having a controller, in accordance with one or more embodiments.

FIG. 3 shows an example of a laser-marking system 126 along the production line 116. The laser-marking system 126 can be used for laser-marking a shot blast resistant identifier on a metal workpiece 110' such as a metal casting 110, in accordance with an embodiment of the present disclosure. In this example, the metal casting 110 is an aluminum casting. However, the metal casting 110 can be made of any other suitable cast metal, such as, but not limited to, non-ferrous metals, specifically zinc, copper, aluminium, magnesium, lead, pewter and/or tin-based alloys.

As depicted in this example, the laser-marking system 126 is part of the identification station 124 which is one of a plurality of transformation stations of the production line 116 of FIG. 2, where the identification station 124 including the laser-marking system 126 is positioned downstream from the die-casting station 12 and upstream from the shot blasting station 20.

Referring back to FIG. 3, in this specific embodiment, the laser-marking system 126 is configured for laser-marking the metal casting 110 as it is being manipulated from the die-casting station 12 to another one of the transformation stations of the production line 116, prior to shot blasting at the shot blasting station 20. In this example, the metal casting 110 is being manipulated using the robot arm 14 and the laser-marking is performed during the manipulation by the robot arm 14. However, the metal casting 110 can be alternatively laser-marked after the manipulation by the robot arm 14. For instance, the robot arm 14 can be used to manipulate the metal casting 110 from the die-casting station to a support surface of the identification station 124, where the metal casting 110 can be laser-marked. It will be understood that the metal casting 110 can also be manipulated by one or more operators, or using a conveyor, vehicle and the like. As discussed above, laser-marking an identifier on the metal casting 110 as soon as possible in the production line 116 can contribute to reducing identification errors which can comprise the traceability of the metal castings 10 made by the production line 116.

As shown in this example, the laser-marking system 126 has a laser beam generator 128, a beam expander 130, one or more scanning heads (hereinafter "the scanning head 132"), a lens 134 and a controller 136 which is communicatively coupled to at least the laser beam generator 128 and to the scanning head 132.

In this example, the laser beam generator 128 is configured for generating a laser beam 136 along an optical path. In one specific embodiment, the laser beam generator 128 is a fiber laser. For instance, the fiber laser can be a Q-switched pulsed fiber laser providing a pulsed laser beam having an operating wavelength of 1.06 microns (i.e., μm, $10^{-6}$ m), a maximal average power of about 100 W, a pulse duration of about 100 ns, a pulse repetition rate of about 100 kHz, a pulse energy of about 1 mJ, and a beam quality factor of M2≈1.6. An example of such fiber laser includes YLP series distributed by IPG Photonics. However, any other suitable laser beam generator can be used depending on the application.

Such operating wavelength can be suitable for laser-marking metal casting 110 such as aluminum castings because aluminum allows satisfactory absorption at that operating wavelength. For different metal types, the type of laser beam generator and/or the operating wavelength of the laser beam generator can be selected based on the metal type of the metal casting 110.

As shown, the beam expander 130 is used to expand a beam diameter of the laser beam 136 to an expanded beam diameter. An example of the expanded beam diameter can include about 10 mm (at the $1/e^2$ width). More specifically, the beam expander 132 is configured for receiving the laser beam 136 from the laser beam generator 128, to expand its beam diameter to the expanded beam diameter, and to provide the expanded laser beam 138 towards the scanning head 132. As can be understood, the beam expander 130 is used so as to achieve a focal spot of satisfactory small dimension when a focal length 131 of the lens 134 is relatively long. However, the beam expander 130 can be omitted in other embodiments.

The scanning head 132 can be used to receive the expanded laser beam 138 incoming from the beam expander 130 and to redirect it towards the metal casting 110 as a focused laser beam 140. As such, the lens 134 is used for focusing the expanded laser beam 138 onto a surface 142 of the metal casting 110. More specifically, the scanning head 132 and the lens 134 are configured for directing a focal spot 144 of the focused laser beam 140 where desired relative to the metal casting 110.

The lens 134 can have a focal length ranging between about 100 mm and about 500 mm, preferably between about 200 mm and about 350 mm and most preferably be of about 250 mm. A lens with a focal length of 250 mm would be more permissible with respect to the positioning of the metal casting 110 to laser-mark compared to conventional laser-marking systems, which typically use lenses with focal lengths of 160 mm.

As shown in this example, the controller 136 is communicatively coupled to the laser beam generator 128 and to the scanning head 132. In embodiments where the lens 134 has a variable focal length, the controller 136 can further be communicatively coupled to the lens 134. The communication between the controller 136 and the laser beam generator 128, the scanning head 132 and the lens 134 can be wired, wireless or a combination of both. As can be understood, the controller 136 is configured for controlling operation of the laser beam generator 128, the scanning head 132 and the lens 134, depending on the embodiment.

The controller 136 can be provided as a combination of hardware and software components. The hardware components can be implemented in the form of a computing device 200, an example of which is described with reference to FIG. 4. Moreover, the software components of the controller 136 can be implemented in the form of a software application 300, an example of which is described with reference to FIG. 5.

Figure 4:
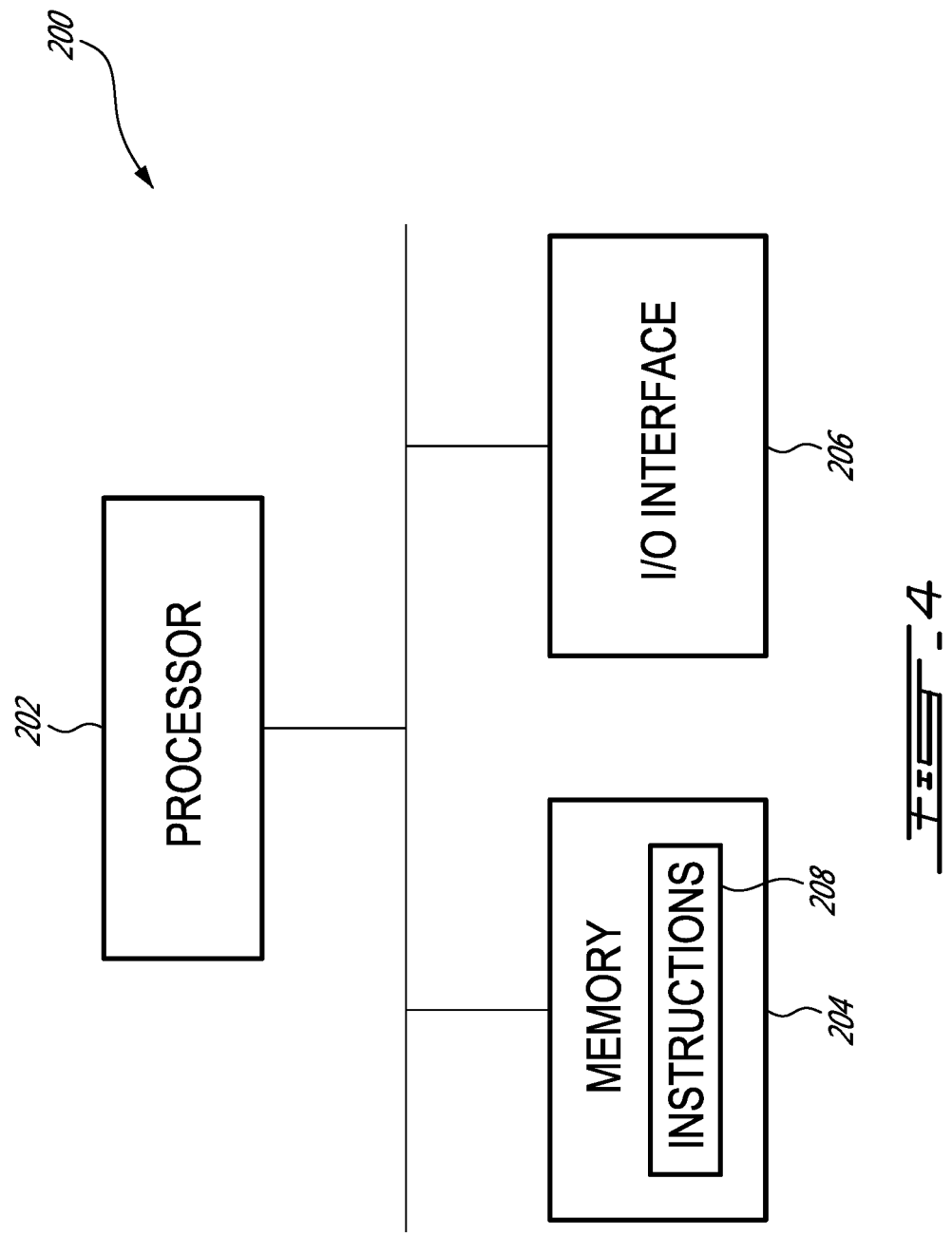
FIG. 4 is a schematic view of an example of a computing device of the controller of FIG. 3, in accordance with one or more embodiments.

Referring to FIG. 4, the computing device 200 can have a processor 202, a memory 204, and I/O interface 206. Instructions 208 for laser-marking the shot blast resistant identifier on a metal casting can be stored on the memory 204 and accessible by the processor 202.

The processor 202 can be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 204 can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM) and electrically-erasable programmable read-only memory (EEPROM), Ferroelectric RAM (FRAM) or the like.

Each I/O interface 206 enables the computing device 200 to interconnect with one or more input devices, such as a managing system of the production line 116, or with one or more output devices such as the laser beam generator 128, the scanning head 132 and/or the lens 134.

Each I/O interface 206 enables the controller 136 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network and others, including any combination of these.

Referring now to FIG. 5, the software application 300 is configured to receive identification data 302 being indicative of an identifier to be laser-marked on the metal casting 110. The software application 300 receives the identification data 302, for instance, from managing system of the production line 116, and then determines instructions 306 upon processing the identification data 302. Determining the instructions 306 may involve receiving information from one or more databases 308 in some embodiment. In some embodiments, the software application 300 is stored on the memory 204 and accessible by the processor 202 of the computing device 200.

The computing device 200 and the software application 300 described above are meant to be examples only. Other suitable embodiments of the controller 136 can also be provided, as it will be apparent to the skilled reader. For instance, in some embodiments, at least part of the controller comprises a USB scanner controller model USC-2 (SCAPS, Germany) and involves the use of software program SAM-Light (SCAPS, Germany).

An example of the identifier data 302 is shown in FIG. 6. As depicted, the identifier data 302 have a multitude of cells where some of the cells correspond to a first binary value (e.g., 0 or 1) and the other cells correspond to a second binary value (e.g., 1 or 0). Another example of the identifier data 302 is shown in FIG. 7. For instance, in this embodiment, the identifier data has a plurality of cells each having a corresponding cell size. The cells include bright cells corresponding to the binary value 0 and dark cells corresponding to the binary value 1. In this example, the identifier data is provided in the form of a data matrix, and the cells have a common cell size c.

The inventors found that existing techniques for laser-marking an identifier on a metal casting typically involved laser-removing metal from a surface of the metal casting on a totality of the area of each one of the dark cells.

Figure 8A:
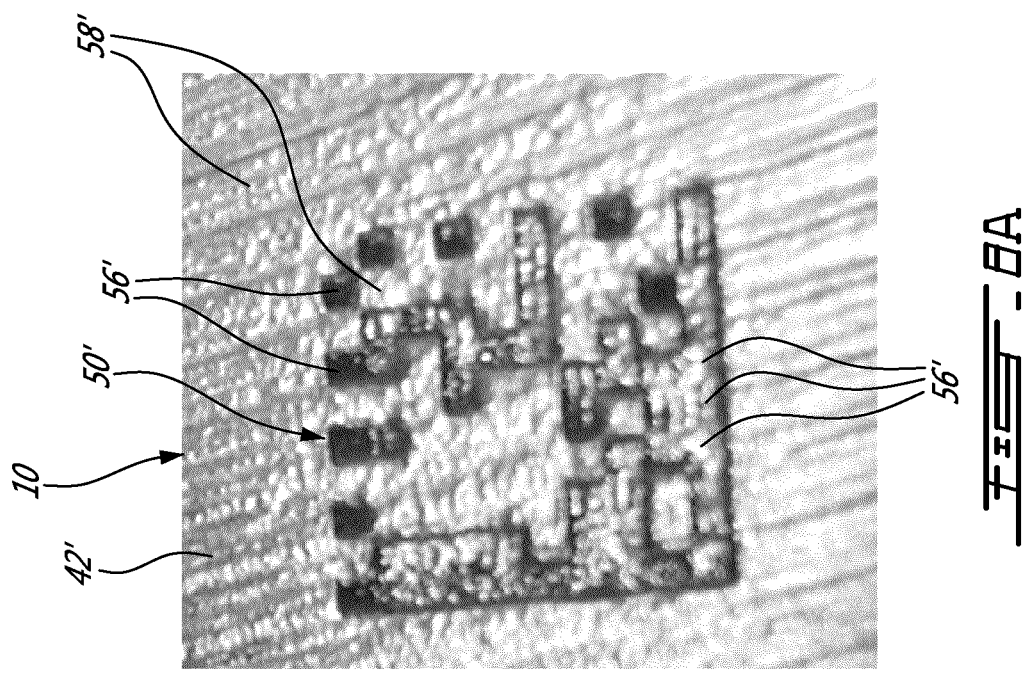
FIG. 8A is a schematic view of the identifier of the metal casting of FIG. 8, shown after shot blasting.
Figure 8:
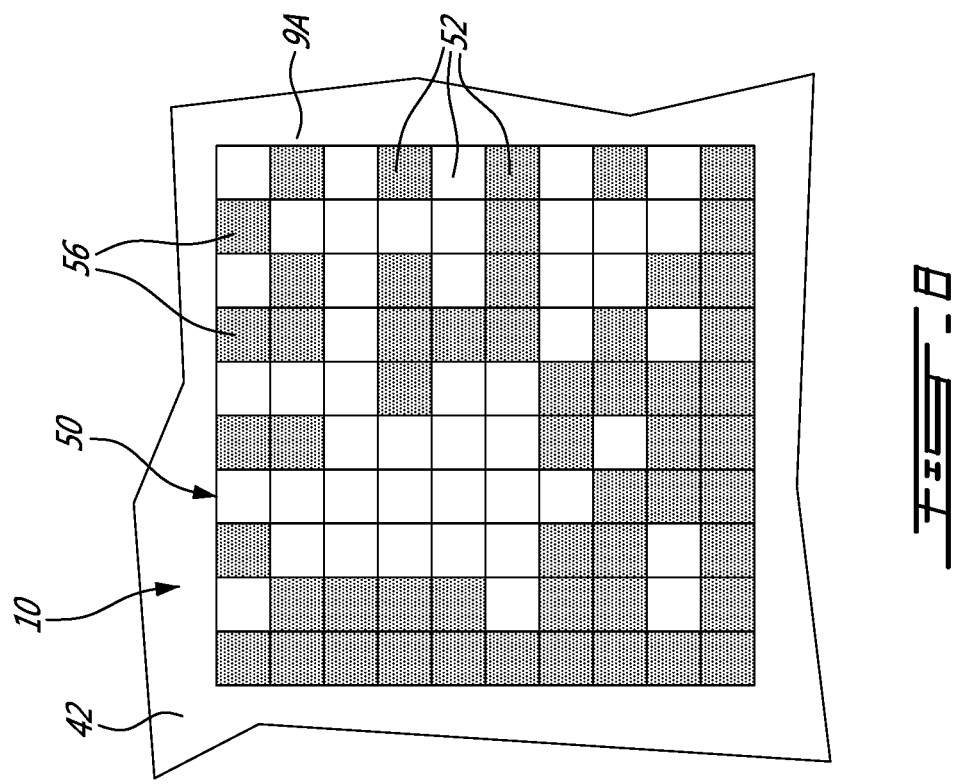
FIG. 8 is a schematic view of a metal casting having the identifier of FIG. 7 marked on a surface thereof, shown prior to shot blasting.
Figure 110:
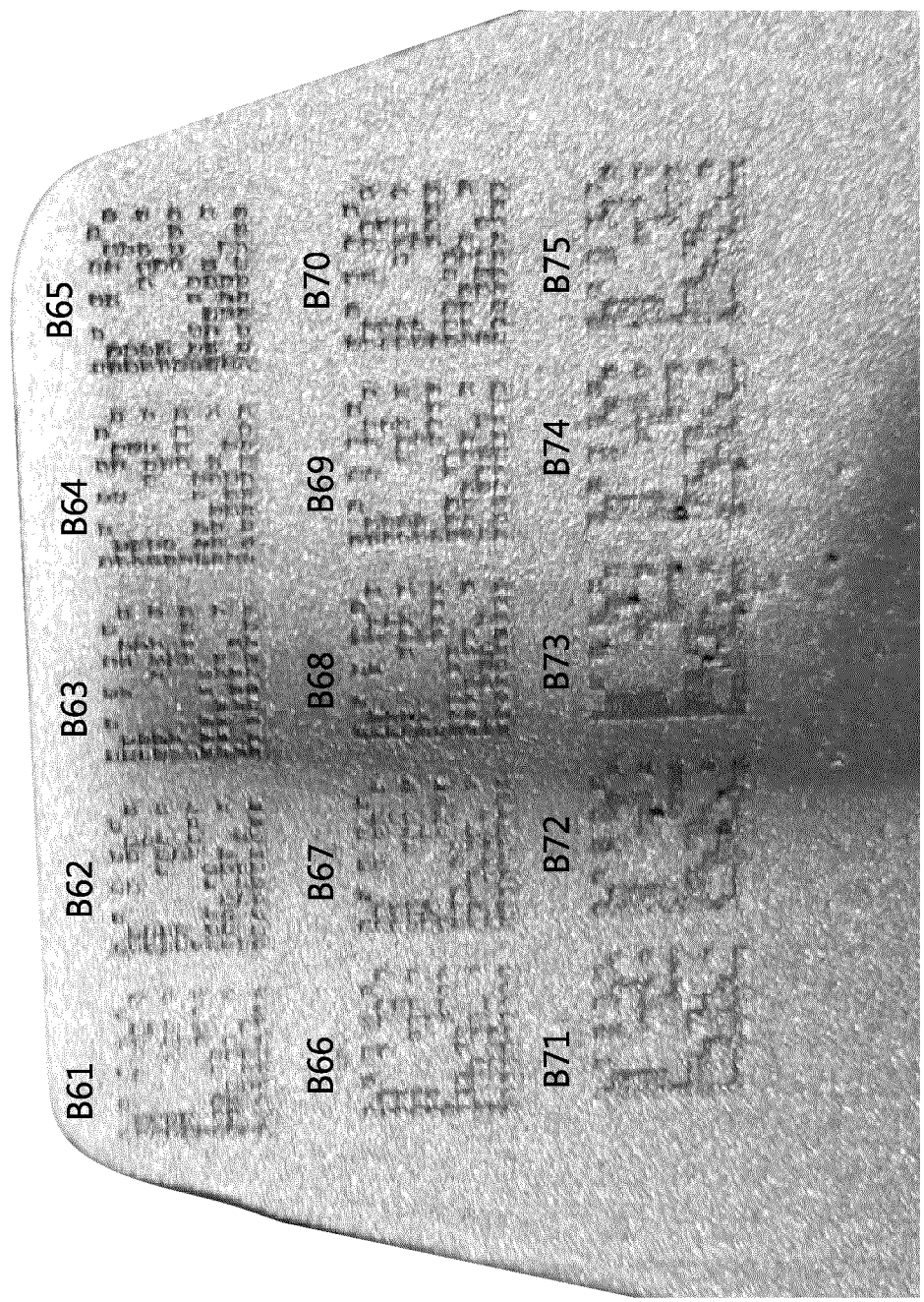

FIGS. 8 and 8A show a laser-marked identifier 50 onto a surface 42 of a metal casting 10 according to existing techniques, prior to and after shot blasting, respectively. As can be understood, cells 52 of the identifier 50 of FIG. 8 may be readable, as an optical reader can distinguish bright cells 54 from dark cells 56, it might not be the case for identifier 50' of FIG. 8A, shown after shot blasting. Indeed, as shown, as isolated ones of the dark cells 56' may still appear dark to an optical reader. However, adjacent ones of the supposedly dark cells 56' do not appear as dark as would be expected to allow satisfactory reading by an optical reader. Hence, the identifier 50' of FIG. 8 cannot be referred to as shot blast resistant as, once shot blasted, dark cells do not appear as dark and in fact can appear almost as bright as the bright cells. It is understood that the surface 42' can be identified as having been previously shot blasted as the surface 42' proximate to the identifier 50' shows a texture 58' indicating shot blasting. As shown, the bright cells have the texture 58' which is indicative that the identifier 50' has been previously shot blasted.

One theory explaining this phenomenon is based on the belief that the dark appearance of the dark cells 56 is due to a surface roughness caused by the laser-marking. It is believed that the surface roughness can trap incoming light and thus prevent light from being reflected thereon, hence the dark appearance. Indeed, as shot blasting involves forcibly propelling a stream of shots, i.e., small particles having a diameter ranging between 300 microns to 800 microns, against the surface 42 of the metal casting 10 under high pressure, it is believed that the surface roughness of the dark cells 56 can become smoother, and thus allow reflection of light hence their brighter appearance. Moreover, laser-marking the entirety of the dark cell can also increase the time required to mark such identifiers.

An example of a method for laser-marking shot blast resistant identifiers 150 on a surface 142 of a metal casting 110 is now described with reference to FIGS. 9, 9A and 9B. More specifically, FIG. 9 shows a top view of the metal casting 110 with a laser-marked shot blast resistant identifier 150 having cells 152, some of them being bright cells 54 and some other being dark cells 156, FIG. 9B shows a top view of one of the dark cells 156 of the shot blast resistant identifier 150 of FIG. 9, and FIG. 9C shows a sectional view of the dark cell 156 of FIG. 9B, taken along line 9C-9C of FIG. 9B.

In this method, the laser-marking includes laser-removing, for each one of the dark cells 156, metal from the surface 142 of the metal casting 110 only at a center portion 160 of the corresponding dark cell 156 thereby leaving a recess 162 bounded by a peripheral wall 164 in the corresponding dark cell 156. For each of the dark cells 156, the recess 162 has a depth d of at least 100 microns and has an opening 166 with a width w (also referred to as "recess opening width w") which ranges between 450 microns and 1200 microns and which represents between 40 percent and 99 percent of the corresponding cell size c. It is intended that the depth d, the width w and the corresponding cell size c of each dark cell 156 are such that the corresponding dark cell appears dark to an optical reader. It is noted that the dimensions of the recess 162 and that of the peripheral wall 164 provide a shot blast resistance to the laser-marked identifier 150. In this disclosure, shot blast resistance is defined broadly so as to encompass any identifier 150 which, after having been shot blasted, can still be read using an optical reader (e.g. a laser reader, camera).

In this way, each one of the dark cells 156, including the isolated ones and the adjacent ones, appear dark to an optical reader after shot blasting as shown in FIG. 9C. Here again, it is understood that the surface 142' can be identified as having been previously shot blasted as the surface 142' proximate to the identifier 150' or the surface 142' of the bright cells show a texture 158' indicating shot blasting. As it will be appreciated by the skilled reader, in contrast with the identifier 50' shown in FIG. 8A, the shot blast resistant identifier 150' shown in FIG. 9A can allow an optical reader such as an optical reader to successfully read the identifier 150' and then track the metal casting 110 based on the reading, even after shot blasting.

Referring now specifically to FIG. 9B, the inventors believe that the dark appearance of the dark cells 156 stem from incoming light being trapped by a roughness 168 of an inside surface 170 of the peripheral wall 164 of the recess 162 and prevent light from being reflected hence the dark appearance. It is envisaged that the profile of the recess 162 can vary from one embodiment to another. For instance, the recess 162 can have different tapered profiles 171 depending on the embodiment, where a dimension of the opening 166 in a plane of the surface 142 decreases as a depth d of the recess 162 increases.

Depending on the embodiment, the depth d can be of at least 100 microns, preferably of at least 150 microns, and most preferably of at least 300 microns. In some embodiments, the depth d of the recess 162 can range between 100 microns and 1000 microns, preferably between 200 microns and 800 microns, and most preferably between 300 microns and 700 microns. The width w of the opening 166 of the recess 162 can range between 400 microns and 1750 microns, preferably between 600 microns and 850 microns, and can thus represent between 30 percent and 99 percent of the corresponding cell size c, preferably between 60 percent and 95 percent of the corresponding cell size c and more preferably between 70 percent and 89 percent of the corresponding cell size c. A thickness t of the peripheral wall 164 can range between 2 microns and 360 microns, preferably between 50 microns and 300 microns, and most preferably between 100 microns and 200 microns. In some embodiments, each recess 162 has an aspect ratio r of the depth d relative to the width w, i.e. r=d/w, ranging between 0.2 and 5, preferably between 0.2 and 2 and most preferably between 0.3 and 1.5. Depending on the embodiment, an area of the recess can be below 99%, preferably below 90% and most preferably below 50% of an area of the corresponding dark cell.

As shown in FIG. 10A, the depth d, the width w and the aspect ratio r of the recess 162 of the dark cell 156 can prevent shots 172 from having a direct access to an entirety of the roughness 168 of the inside surface 170 of the peripheral wall 164. Moreover, bouncing of a shot 172 on the inside surface 170 of the peripheral wall 164 can reduce its kinetic energy and thus limit the smoothing of the roughness 168 of the inside surface 170 in subsequent bounces of the shot 172. Alternately, or additionally, the shot 172 may not even have access to a bottom 174 of the recess 162 when the recess 162 has a substantially tapered shape, such as the one illustrated in FIG. 10A.

As shown in FIG. 10B, the presence of the peripheral wall 164 of the recess 162 of the dark cell 156 can prevent shots from damaging the dark cell 156. Indeed, the peripheral wall 164 is thick enough to substantially maintain its shape so that it does not collapse during shot blasting.

Examples of such shot blast resistant identifiers being laser-marked on metal workpieces are shown in FIGS. 11A-L. As will be understood, the identifiers shown in these figures have been laser-marked and then shot blasted, following by a contrast characterization to determine a contrast between an average gray level of the dark cells versus an average gray level of the bright cells. A contrast of 0 means that the identifier is not shot blast resistant as it cannot be read using an optical reader. However, a contrast greater than 0 means that the identifier can be read after shot blast. Moreover, a contrast being greater than 300 can be identified as a satisfactory shot blast resistant (e.g., of grade 4) which can be read using any type of reader.

TABLE 1

Parameters used by the controller to laser-mark the identifiers shown in FIGS. 11A-D

| Width w of recess in percent of cell size c of 1000 microns [%] | Time required to laser-mark identifier [s] | Contrast [/100] | Depth d [mm] | Aspect Ratio [-] | ID |
|---|---|---|---|---|---|
| 30 | 7.68 | 0 | 0.6 | 2.00 | A5 |
|  | 6.29 | 0 | 0.55 | 1.83 | A4 |
|  | 4.89 | 0 | 0.45 | 1.50 | A3 |
|  | 3.5 | 0 | 0.3 | 1.00 | A2 |
|  | 2.11 | 0 | 0.15 | 0.50 | A1 |
| 35 | 9.83 | 0 | 0.6 | 1.71 | A10 |
|  | 8 | 0 | 0.55 | 1.57 | A9 |
|  | 6.18 | 0 | 0.45 | 1.29 | A8 |
|  | 4.36 | 0 | 0.3 | 0.86 | A7 |
|  | 2.54 | 0 | 0.15 | 0.43 | A6 |
| 40 | 12.19 | 190 | 0.6 | 1.50 | A15 |
|  | 9.9 | 180 | 0.55 | 1.38 | A14 |
|  | 7.6 | 130 | 0.45 | 1.13 | A13 |
|  | 5.3 | 120 | 0.3 | 0.75 | A12 |
|  | 3.01 | 0 | 0.15 | 0.38 | A11 |
| 45 | 13.86 | 190 | 0.6 | 1.33 | A20 |
|  | 11.23 | 180 | 0.55 | 1.22 | A19 |
|  | 8.6 | 130 | 0.45 | 1.00 | A18 |
|  | 5.97 | 120 | 0.3 | 0.67 | A17 |
|  | 3.34 | 0 | 0.15 | 0.33 | A16 |
| 50 | 16.62 | 270 | 0.6 | 1.20 | A25 |
|  | 13.45 | 230 | 0.55 | 1.10 | A24 |
|  | 10.26 | 290 | 0.45 | 0.90 | A23 |
|  | 7.07 | 180 | 0.3 | 0.60 | A22 |
|  | 3.9 | 180 | 0.15 | 0.30 | A21 |
| 55 | 19.6 | 400 | 0.6 | 1.09 | A30 |
|  | 15.82 | 330 | 0.55 | 1.00 | A29 |
|  | 12.05 | 290 | 0.45 | 0.82 | A28 |
|  | 8.27 | 210 | 0.3 | 0.55 | A27 |
|  | 4.49 | 210 | 0.15 | 0.27 | A26 |
| 60 | 21.69 | 400 | 0.6 | 1.00 | A35 |
|  | 17.5 | 370 | 0.55 | 0.92 | A34 |
|  | 13.31 | 330 | 0.45 | 0.75 | A33 |
|  | 9.11 | 270 | 0.3 | 0.50 | A32 |
|  | 4.91 | 270 | 0.15 | 0.25 | A31 |

TABLE 1-continued

Parameters used by the controller to laser-mark the identifiers shown in FIGS. 11A-D

| Width w of recess in percent of cell size c of 1000 microns [%] | Time required to laser-mark identifier [s] | Contrast [/100] | Depth d [mm] | Aspect Ratio [-] | ID |
|---|---|---|---|---|---|
| 65 | 25.05 | 470 | 0.6 | 0.92 | A40 |
|  | 20.19 | 380 | 0.55 | 0.85 | A39 |
|  | 15.32 | 360 | 0.45 | 0.69 | A38 |
|  | 10.45 | 340 | 0.3 | 0.46 | A37 |
|  | 5.58 | 340 | 0.15 | 0.23 | A36 |
| 70 | 28.62 | 330 | 0.6 | 0.86 | B45 |
|  | 23.04 | 330 | 0.55 | 0.79 | B44 |
|  | 17.46 | 400 | 0.45 | 0.64 | B43 |
|  | 11.89 | 360 | 0.3 | 0.43 | B42 |
|  | 6.3 | 300 | 0.15 | 0.21 | B41 |
| 75 | 31.16 | 380 | 0.6 | 0.80 | B50 |
|  | 25.08 | 390 | 0.55 | 0.73 | B49 |
|  | 18.99 | 380 | 0.45 | 0.60 | B48 |
|  | 12.9 | 360 | 0.3 | 0.40 | B47 |
|  | 6.81 | 270 | 0.15 | 0.20 | B46 |
| 80 | 35.13 | 370 | 0.6 | 0.75 | B55 |
|  | 28.24 | 390 | 0.55 | 0.69 | B54 |
|  | 21.36 | 360 | 0.45 | 0.56 | B53 |
|  | 14.48 | 350 | 0.3 | 0.38 | B52 |
|  | 7.6 | 340 | 0.15 | 0.19 | B51 |
| 85 | 39.31 | 370 | 0.6 | 0.71 | B60 |
|  | 31.58 | 350 | 0.55 | 0.65 | B59 |
|  | 23.86 | 340 | 0.45 | 0.53 | B58 |
|  | 16.14 | 340 | 0.3 | 0.35 | B57 |
|  | 8.43 | 300 | 0.15 | 0.18 | B56 |
| 90 | 42.28 | 400 | 0.6 | 0.67 | B65 |
|  | 33.97 | 440 | 0.55 | 0.61 | B64 |
|  | 25.65 | 50 | 0.45 | 0.50 | B63 |
|  | 17.34 | 420 | 0.3 | 0.33 | B62 |
|  | 9.03 | 420 | 0.15 | 0.17 | B61 |
| 95 | 46.86 | 420 | 0.6 | 0.63 | B70 |
|  | 37.63 | 430 | 0.55 | 0.58 | B69 |
|  | 28.4 | 370 | 0.45 | 0.47 | B68 |
|  | 19.16 | 440 | 0.3 | 0.32 | B67 |
|  | 9.94 | 0 | 0.15 | 0.16 | B66 |
| 100 | 45.36 | 0 | 0.6 | 0.60 | B75 |
|  | 36.43 | 0 | 0.55 | 0.55 | B74 |
|  | 27.5 | 0 | 0.45 | 0.45 | B73 |
|  | 18.58 | 0 | 0.3 | 0.30 | B72 |
|  | 9.65 | 0 | 0.15 | 0.15 | B71 |

TABLE 2

Figure 11A:
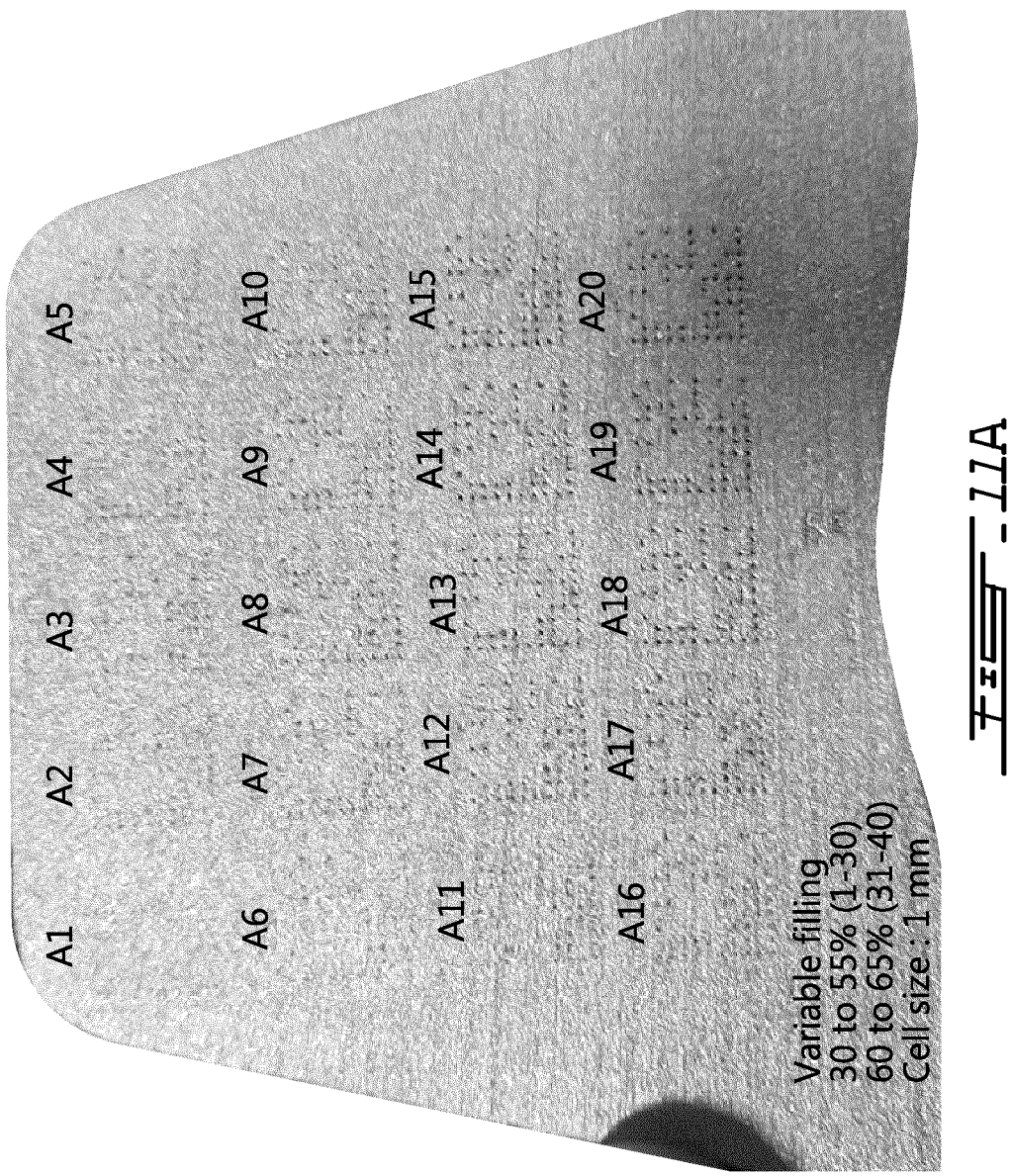
Figure 11C:
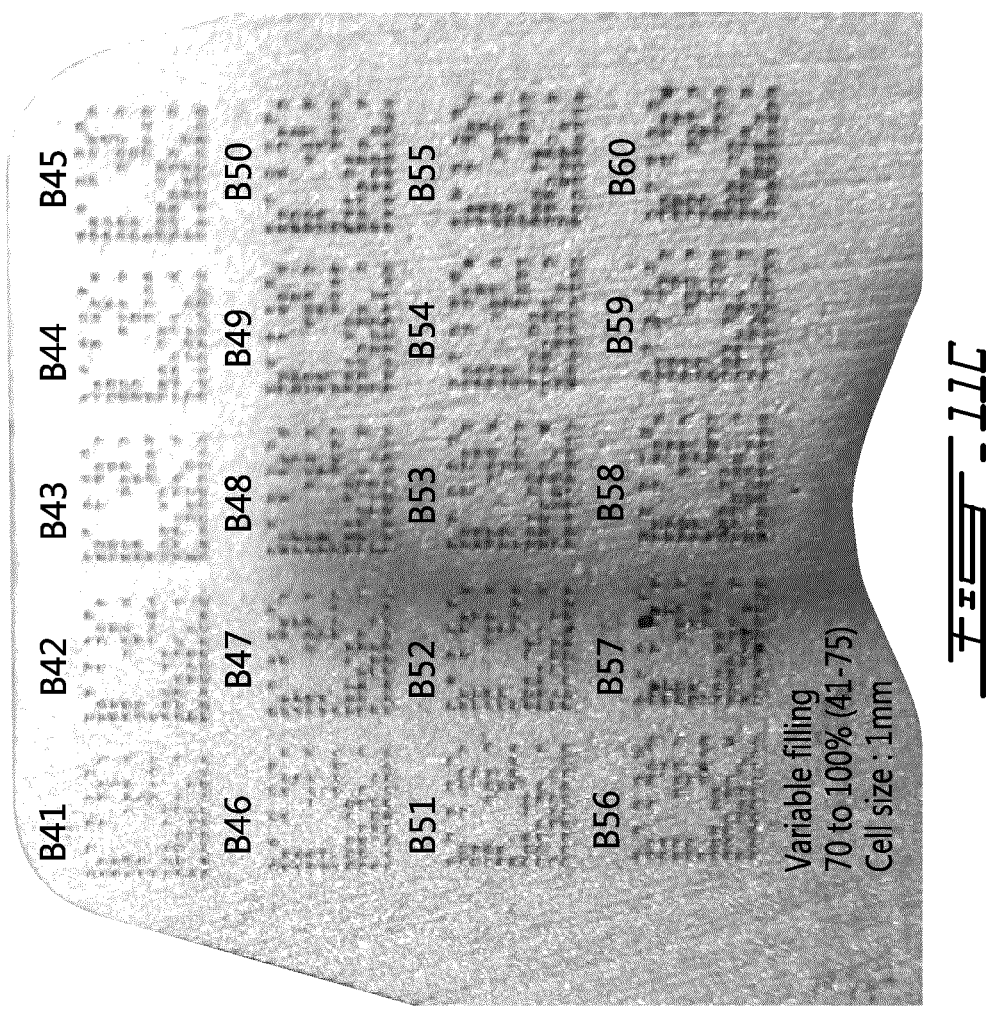
Figure 11E:
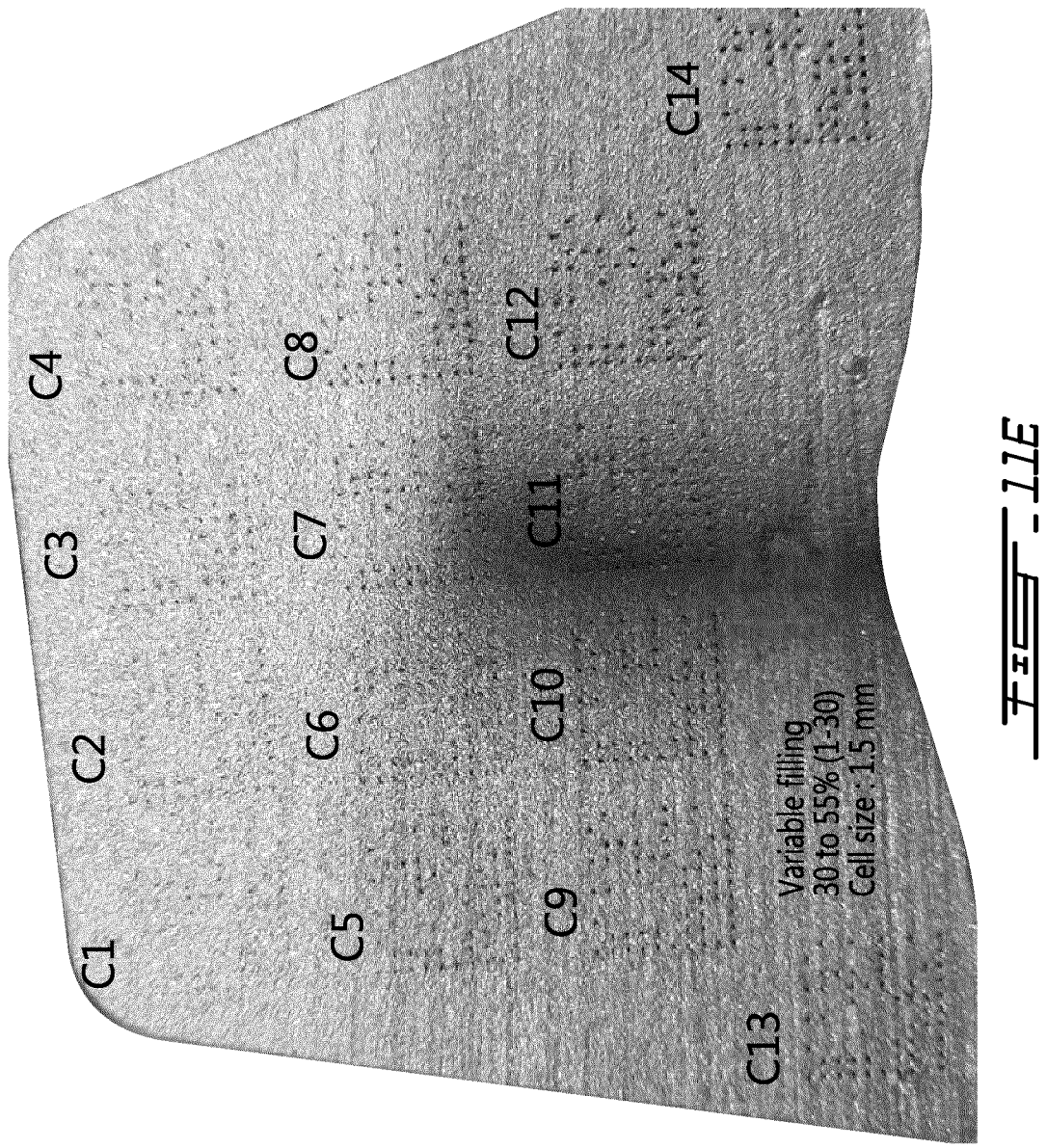
Figure 11F:
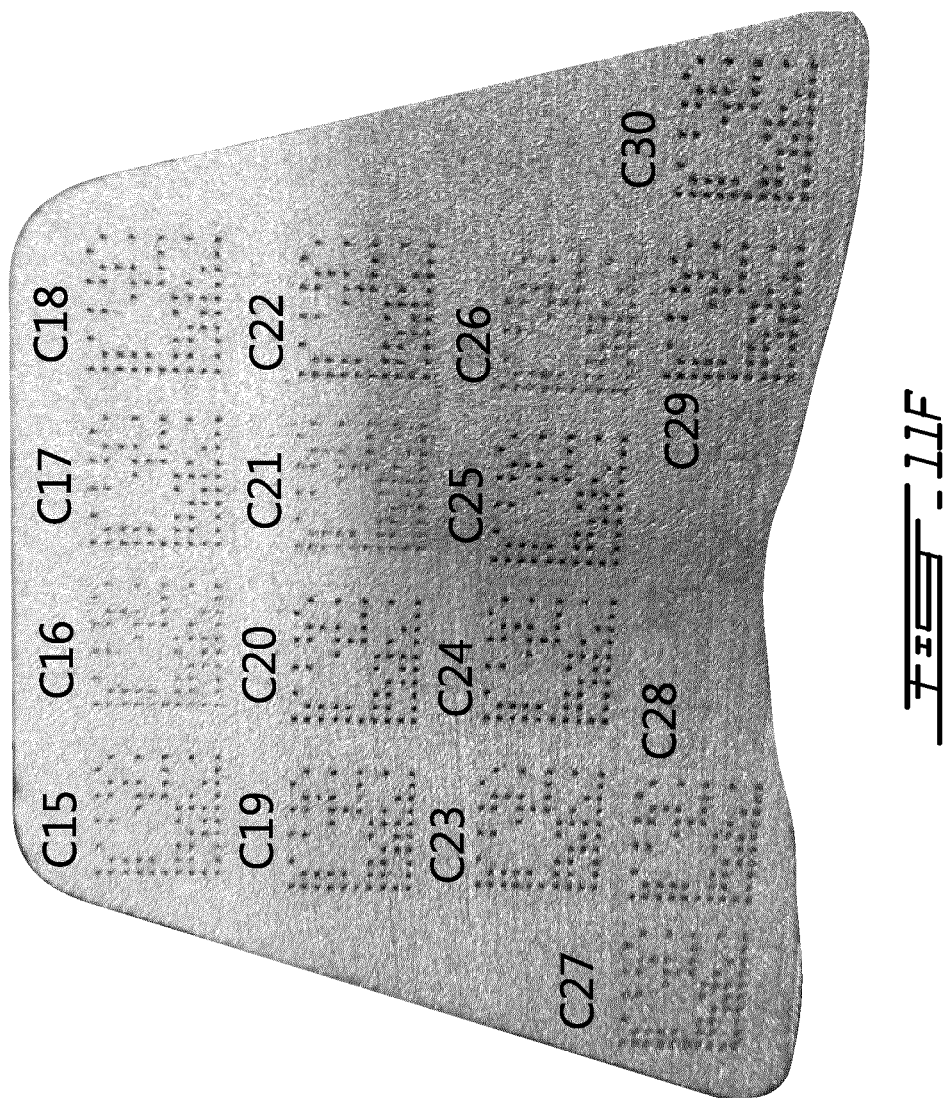
Figure 11G:
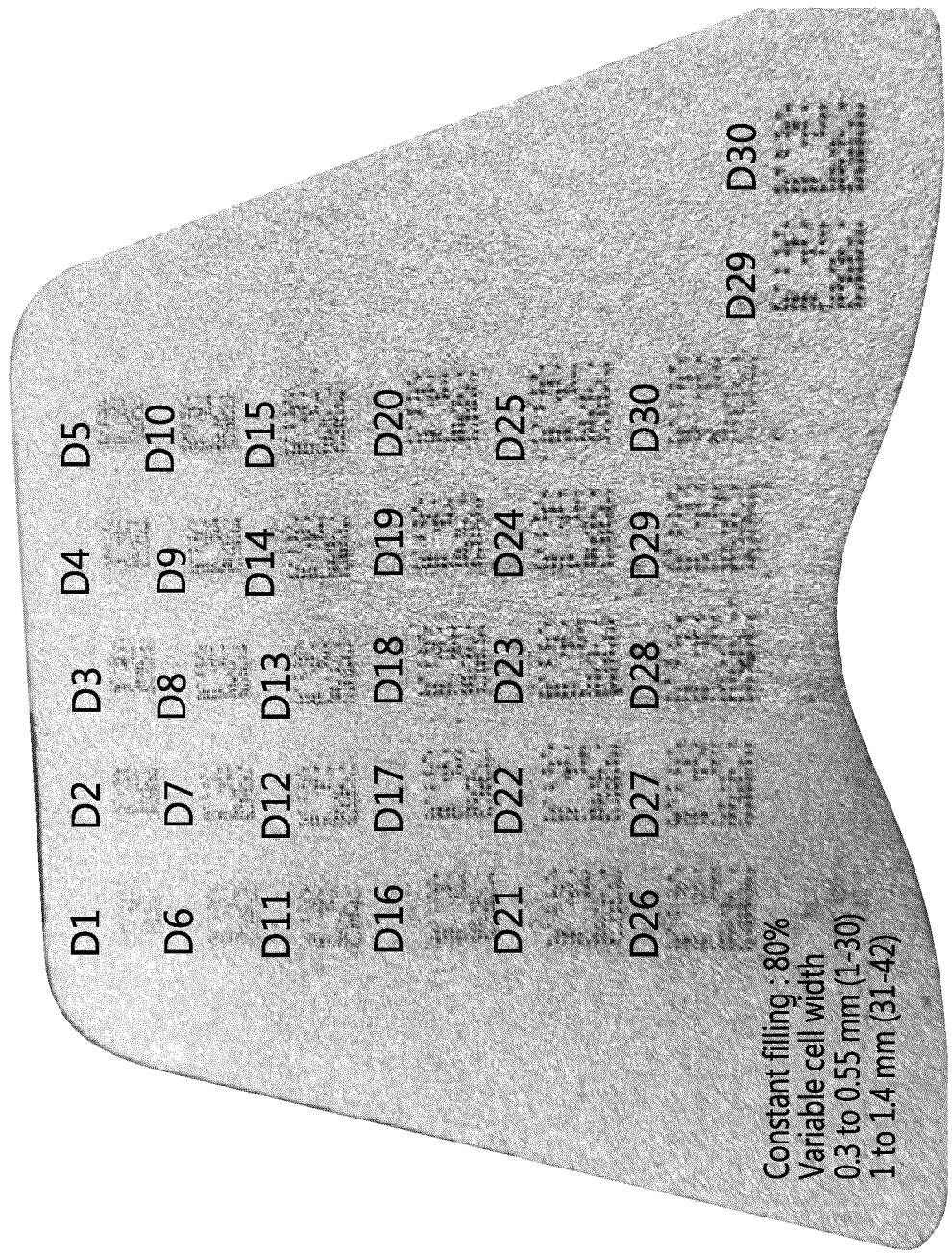
Figure 11H:
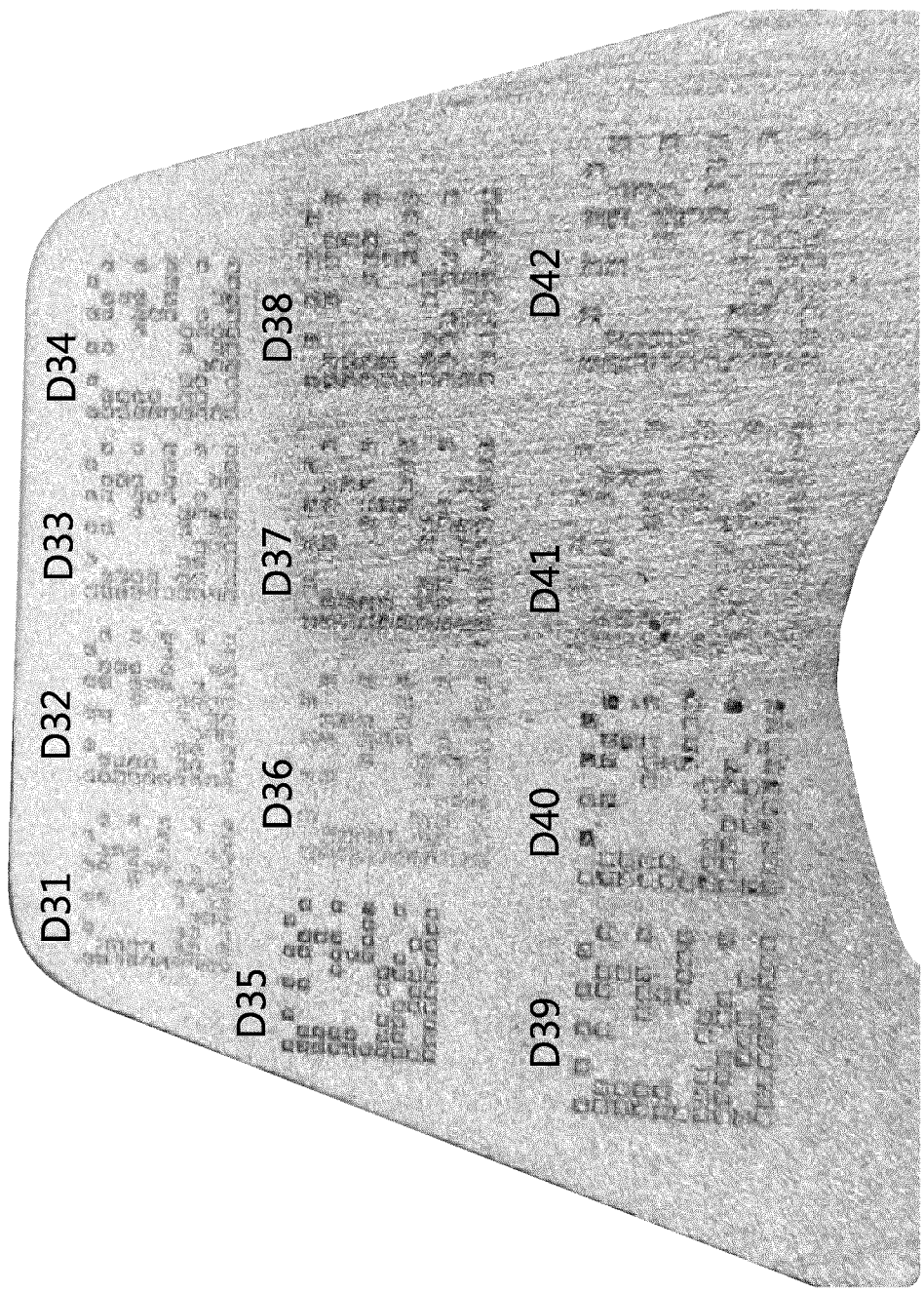
Figure 11I:
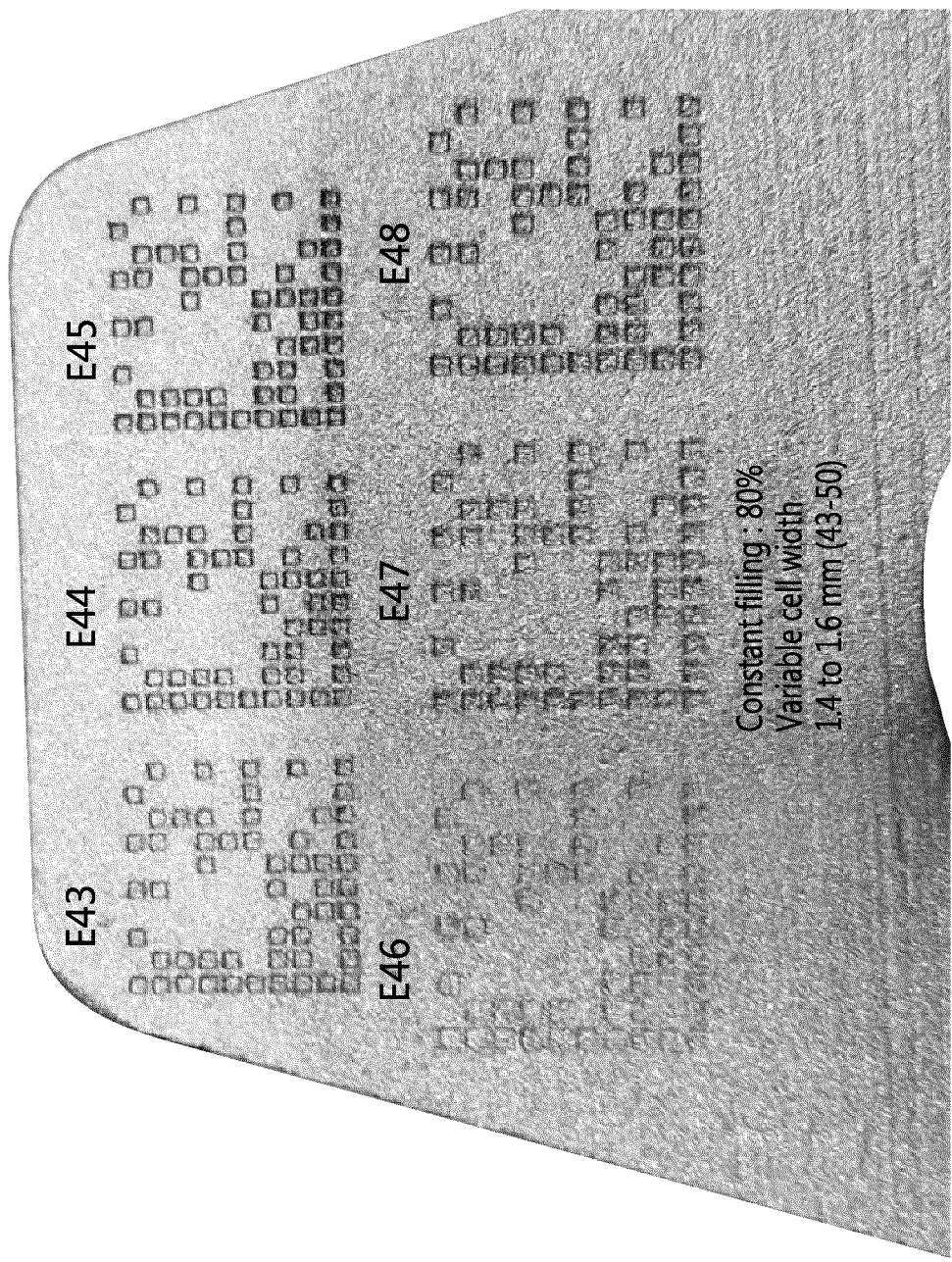
Figure 11J:
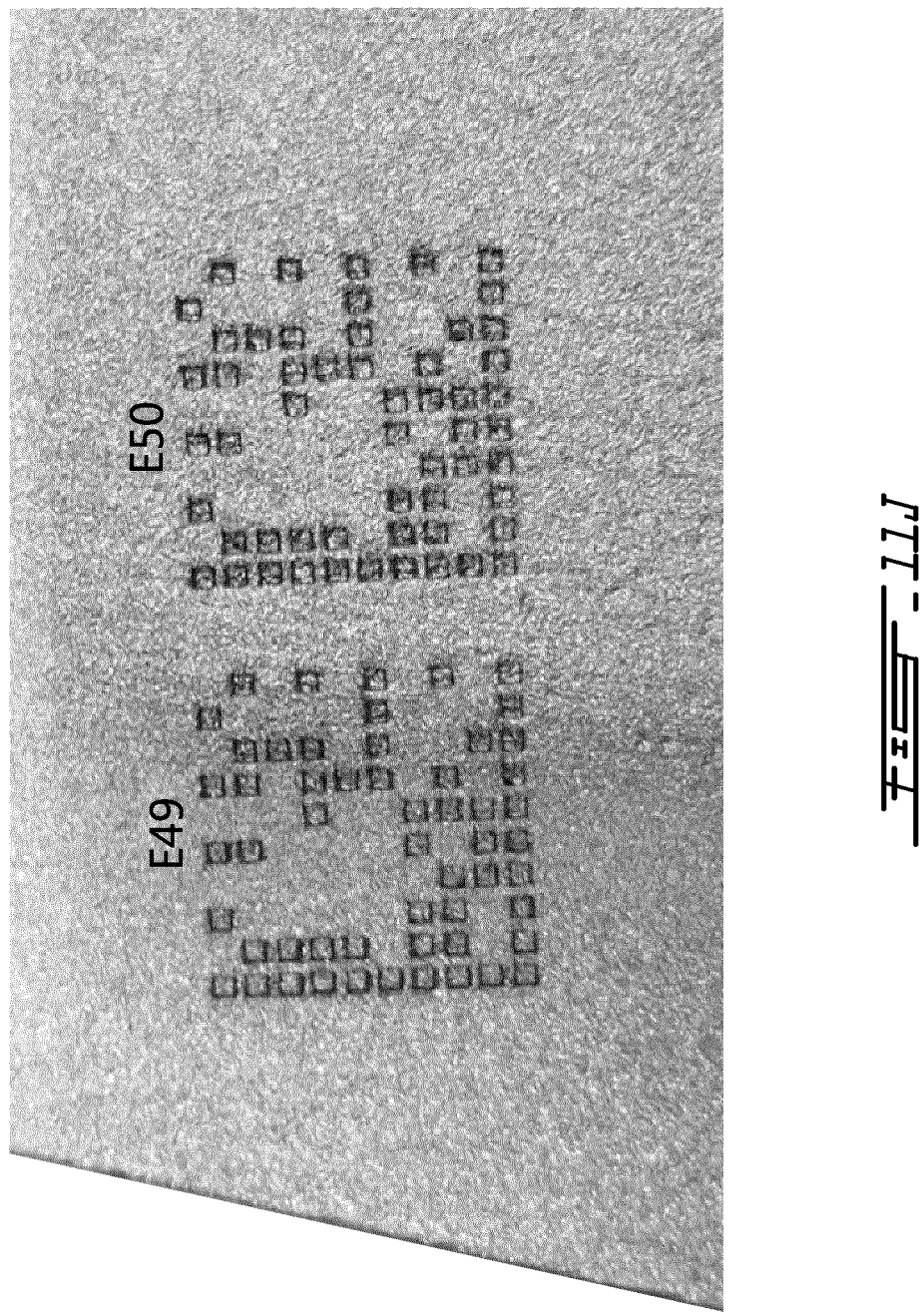
Figure 11K:
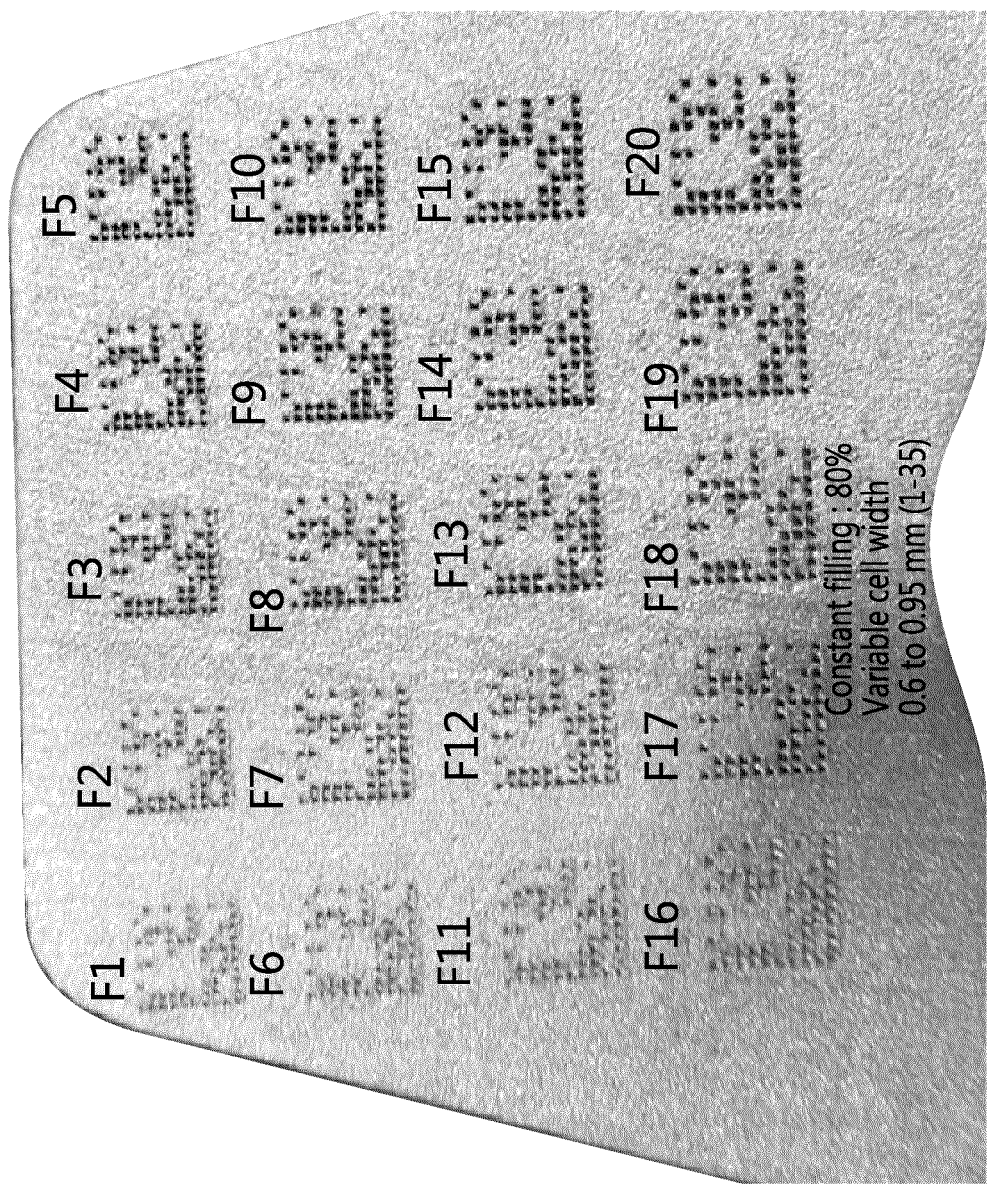
Figure 11I:
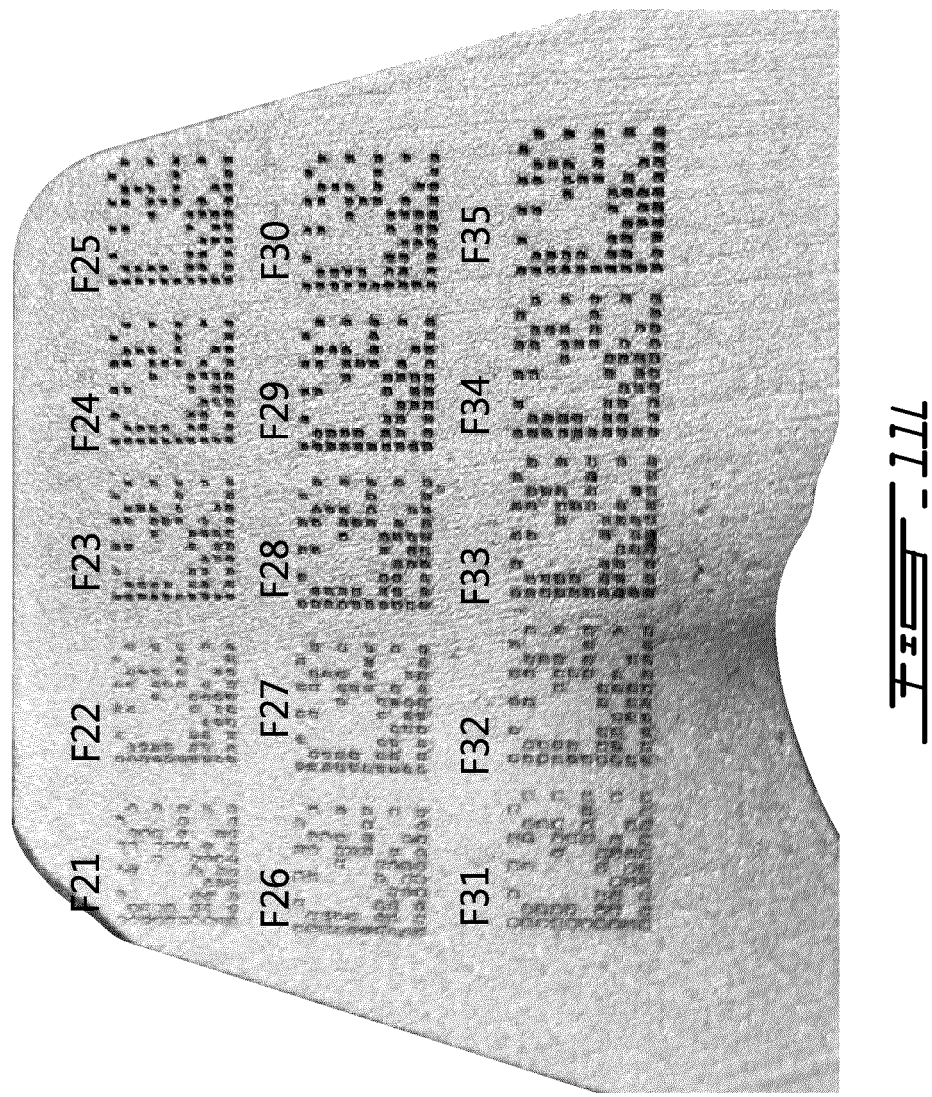

Parameters used by the controller to laser-mark the identifiers shown in FIGS. 11E-F

| Width w of recess in [mm] with cell size of 1500 mm | Time required to laser-mark identifier [s] | Contrast [/100] | Depth d [mm] | Aspect Ratio [-] | ID |
|---|---|---|---|---|---|
| 0.45 | 8.85 | 0 | 0.6 | 1.33 | C5 |
|  | 7.26 | 0 | 0.55 | 1.22 | C4 |
|  | 5.66 | 0 | 0.45 | 1.00 | C3 |
|  | 4.07 | 0 | 0.3 | 0.67 | C2 |
|  | 3.18 | 0 | 0.15 | 0.33 | C1 |
| 0.525 | 11.4 | 120 | 0.6 | 1.14 | C10 |
|  | 9.3 | 0 | 0.55 | 1.05 | C9 |
|  | 7.2 | 0 | 0.45 | 0.86 | C8 |
|  | 5.09 | 0 | 0.3 | 0.57 | C7 |
|  | 2.98 | 0 | 0.15 | 0.29 | C6 |
| 0.6 | 14.23 | 170 | 0.6 | 1.00 | C15 |
|  | 11.55 | 170 | 0.55 | 0.92 | C14 |
|  | 8.89 | 160 | 0.45 | 0.75 | C13 |
|  | 6.23 | 130 | 0.3 | 0.50 | C12 |
|  | 3.55 | 0 | 0.15 | 0.25 | C11 |
| 0.675 | 16.27 | 210 | 0.6 | 0.89 | C20 |
|  | 13.19 | 190 | 0.55 | 0.81 | C19 |
|  | 10.11 | 220 | 0.45 | 0.67 | C18 |
|  | 7.04 | 190 | 0.3 | 0.44 | C17 |
|  | 3.96 | 0 | 0.15 | 0.22 | C16 |
| 0.75 | 19.55 | 300 | 0.6 | 0.80 | C25 |
|  | 15.83 | 390 | 0.55 | 0.73 | C24 |
|  | 12.09 | 360 | 0.45 | 0.60 | C23 |
|  | 8.36 | 210 | 0.3 | 0.40 | C22 |
|  | 4.62 | 0 | 0.15 | 0.20 | C21 |
| 0.825 | 23.17 | 460 | 0.6 | 0.73 | C30 |
|  | 18.72 | 400 | 0.55 | 0.67 | C29 |
|  | 14.26 | 420 | 0.45 | 0.55 | C28 |
|  | 9.8 | 440 | 0.3 | 0.36 | C27 |
|  | 5.34 | 150 | 0.15 | 0.18 | C26 |

TABLE 3

Parameters used by the controller to laser-mark the identifiers shown in FIGS. 11G-K

| Width w in [mm] (Cell size c in [mm]) | Time required to laser-mark identifier [s] | Contrast [/100] | Depth d [mm] | Aspect Ratio [-] | ID |
|---|---|---|---|---|---|
| 0.3 (0.375) | 20.65 | 0 | 0.6 | 2.00 | D5 |
|  | 16.6 | 0 | 0.55 | 1.83 | D4 |
|  | 12.55 | 0 | 0.45 | 1.50 | D3 |
|  | 8.51 | 0 | 0.3 | 1.00 | D2 |
|  | 4.46 | 0 | 0.15 | 0.50 | D1 |
| 0.35 (0.4375) | 22.13 | 0 | 0.6 | 1.71 | D10 |
|  | 17.79 | 0 | 0.55 | 1.57 | D9 |
|  | 13.44 | 0 | 0.45 | 1.29 | D8 |
|  | 9.11 | 0 | 0.3 | 0.86 | D7 |
|  | 4.77 | 0 | 0.15 | 0.43 | D6 |
| 0.4 (0.5) | 23.65 | 0 | 0.6 | 1.50 | D15 |
|  | 19.02 | 0 | 0.55 | 1.38 | D14 |
|  | 14.38 | 0 | 0.45 | 1.13 | D13 |
|  | 9.75 | 0 | 0.3 | 0.75 | D12 |
|  | 5.12 | 0 | 0.15 | 0.38 | D11 |
| 0.45 (0.5625) | 25.12 | 410 | 0.6 | 1.33 | D20 |
|  | 20.2 | 400 | 0.55 | 1.22 | D19 |
|  | 15.27 | 370 | 0.45 | 1.00 | D18 |
|  | 10.35 | 420 | 0.3 | 0.67 | D17 |
|  | 5.43 | 235 | 0.15 | 0.33 | D16 |
| 0.5 (0.625) | 26.61 | 400 | 0.6 | 1.20 | D25 |
|  | 21.39 | 485 | 0.55 | 1.10 | D24 |
|  | 16.18 | 430 | 0.45 | 0.90 | D23 |
|  | 10.96 | 390 | 0.3 | 0.60 | D22 |
|  | 5.74 | 380 | 0.15 | 0.30 | D21 |
| 0.55 (0.6875) | 28.11 | 380 | 0.6 | 1.09 | D30 |
|  | 22.6 | 400 | 0.55 | 1.00 | D29 |
|  | 17.09 | 370 | 0.45 | 0.82 | D28 |
|  | 11.58 | 360 | 0.3 | 0.55 | D27 |
|  | 6.07 | 350 | 0.15 | 0.27 | D26 |
| 0.6 (0.75) | 29.6 | 440 | 0.6 | 1.00 | F5 |
|  | 23.8 | 450 | 0.55 | 0.92 | F4 |
|  | 17.98 | 310 | 0.45 | 0.75 | F3 |
|  | 12.18 | 300 | 0.3 | 0.50 | F2 |
|  | 6.38 | 270 | 0.15 | 0.25 | F1 |
| 0.65 (0.8125) | 31.1 | 490 | 0.6 | 0.92 | F10 |
|  | 25.01 | 430 | 0.55 | 0.85 | F9 |
|  | 18.9 | 440 | 0.45 | 0.69 | F8 |
|  | 12.81 | 430 | 0.3 | 0.46 | F7 |
|  | 6.72 | 420 | 0.15 | 0.23 | F6 |

TABLE 3-continued

Parameters used by the controller to laser-mark the identifiers shown in FIGS. 11G-K

| Width w in [mm] (Cell size c in [mm]) | Time required to laser-mark identifier [s] | Contrast [/100] | Depth d [mm] | Aspect Ratio [–] | ID |
|---|---|---|---|---|---|
| 0.7 (0.875) | 32.59 | 550 | 0.6 | 0.86 | F15 |
| | 26.2 | 500 | 0.55 | 0.79 | F14 |
| | 19.81 | 550 | 0.45 | 0.64 | F13 |
| | 13.42 | 490 | 0.3 | 0.43 | F12 |
| | 7.04 | 460 | 0.15 | 0.21 | F11 |
| 0.75 (0.9875) | 34.54 | 550 | 0.6 | 0.80 | F20 |
| | 27.77 | 510 | 0.55 | 0.73 | F19 |
| | 21 | 560 | 0.45 | 0.60 | F18 |
| | 14.23 | 520 | 0.3 | 0.40 | F17 |
| | 7.38 | 500 | 0.15 | 0.20 | F16 |
| 0.85 (1.0625) | 37.08 | 440 | 0.6 | 0.71 | F25 |
| | 29.81 | 430 | 0.55 | 0.65 | F24 |
| | 22.54 | 400 | 0.45 | 0.53 | F23 |
| | 15.27 | 400 | 0.3 | 0.35 | F22 |
| | 8 | 360 | 0.15 | 0.18 | F21 |
| 0.9 (1.125) | 38.57 | 470 | 0.6 | 0.67 | F30 |
| | 31.01 | 430 | 0.55 | 0.61 | F29 |
| | 23.45 | 450 | 0.45 | 0.50 | F28 |
| | 15.89 | 420 | 0.3 | 0.33 | F27 |
| | 8.33 | 400 | 0.15 | 0.17 | F26 |
| 0.95 (1.1875) | 40.06 | 540 | 0.6 | 0.63 | F35 |
| | 32.21 | 500 | 0.55 | 0.58 | F34 |
| | 24.35 | 480 | 0.45 | 0.47 | F33 |
| | 16.5 | 450 | 0.3 | 0.32 | F32 |
| | 8.64 | 380 | 0.15 | 0.16 | F31 |
| 1 (1.25) | 41.57 | 355 | 0.6 | 0.60 | D35 |
| | 33.42 | 330 | 0.55 | 0.55 | D34 |
| | 25.27 | 310 | 0.45 | 0.45 | D33 |
| | 17.13 | 300 | 0.3 | 0.30 | D32 |
| | 8.98 | 280 | 0.15 | 0.15 | D31 |
| 1.2 (1.5) | 47.57 | 300 | 0.6 | 0.50 | D40 |
| | 38.24 | 280 | 0.55 | 0.46 | D39 |
| | 28.92 | 250 | 0.45 | 0.38 | D38 |
| | 19.6 | 200 | 0.3 | 0.25 | D37 |
| | 10.29 | 170 | 0.15 | 0.13 | D36 |
| 1.4 (1.75) | 53.57 | 380 | 0.6 | 0.43 | E45 |
| | 43.07 | 320 | 0.55 | 0.39 | E44 |
| | 32.58 | 260 | 0.45 | 0.32 | E43 |
| | 22.09 | 0 | 0.3 | 0.21 | D42 |
| | 11.6 | 0 | 0.15 | 0.11 | D41 |
| 1.6 (2) | 59.56 | 300 | 0.6 | 0.38 | E50 |
| | 47.9 | 280 | 0.55 | 0.34 | E49 |
| | 36.23 | 180 | 0.45 | 0.28 | E48 |
| | 24.58 | 0 | 0.3 | 0.19 | E47 |
| | 12.91 | 0 | 0.15 | 0.09 | E46 |

The results above have been interpreted not only evaluated for the optimal laser-marking parameters but also for the analysis of outer boundaries where readability of the code would be close to null. A total of 195 markings were made on workpieces made of an aluminium alloy containing 10% Si. These markings were made using a 100 W laser marking system, the LXQ-100. The laser marking parameters were kept constant to reduce the different variables in play. The identifiers marked are 10×10 2D matrix codes containing the information "123456". The laser-marking speed was set to 500 mm/s, at a frequency of 100 kHz and a line spacing of 0.03 mm in both the x-axis and y-axis of the plane of the workpieces. These identifiers were marked on an optional white background which was marked at 5000 m/s, a frequency 100 kHz and a line spacing of 0.05 mm.

Width w and depth d are two parameters that were varied from one giving identifier to another. The depth d was translated through a parameter called the "number of time or passes" the focal spot was directed along a predetermined raster path. This parameter, which was represented through an integer value, is indicative of a number of time the laser spot would spend laser-marking any given area. Thus, a given identifier having a number of time equal to five would have its recesses etched deeper in the workpiece than an identifier having a value of one since the laser spot would have been directed five times along the raster path on the same area instead of a single one. The number of passes was varied from 1 to 5 for every markings. A depth measurement system such as a Dektak was used to translate the value of "number of passes" to a value of depth d. These values were compared with different identifiers and extrapolated to the depth values given in the tables above.

The 195 markings were analyzed for their contrast before and after the shot blasting process using a Cognex camera DM262X. The contrast value is calculated according to ISO 29158 using the following equation:

$$CC = \frac{A_W - A_D}{A_W}, \quad (1)$$

where $A_W$ would be the average average intensity of bright cells on a gray scale of 255 whereas $A_D$ is the average intensity of dark cells on a gray scale of 255. In the above tables, the contrast CC is multiplied by 100 to achieve the desired range in the tables.

It is noted that the contrasts obtained in this experiment are provided as examples only, as these results are dependent on the specific experimental setup which used the Cognex camera DM262X. Indeed, with other experimental setups, including other types of readers, the contrasts of some given identifiers listed above could still be satisfactory even though they are listed as unsatisfactory in the above tables. For instance, identifiers A8, B66, C13, C14, C15, C16, C21, D12, D14, D15 and E47, which are characterized by a null contrast above, have been satisfactorily read using for instance a Cognex reader. Accordingly, the inventors believe it safe to assume that the range of values which can yield shot blast resistant identifiers are not limited to that listed in the above tables.

The above tables can be analyzed to provide an analysis of contrast in relation with different parameters such as width w, time required for laser-marking the identifier, depth d and aspect ratio d/w. According to ISO 29158, a contrast value above 0.300 (so 300 in the above tables) would give a grade 4 which would be the highest according to the standard.

It was noted that the dark cells having a width w being less than 50% of their corresponding cell size c often failed to achieve a grade 4 contrast (even though they may still be readable). This can be explained by the fact that the extra surface of the peripheral walls being smoothed by shot blasting can affect the readability and the evaluation of the contrast by the camera.

Figure 11M:
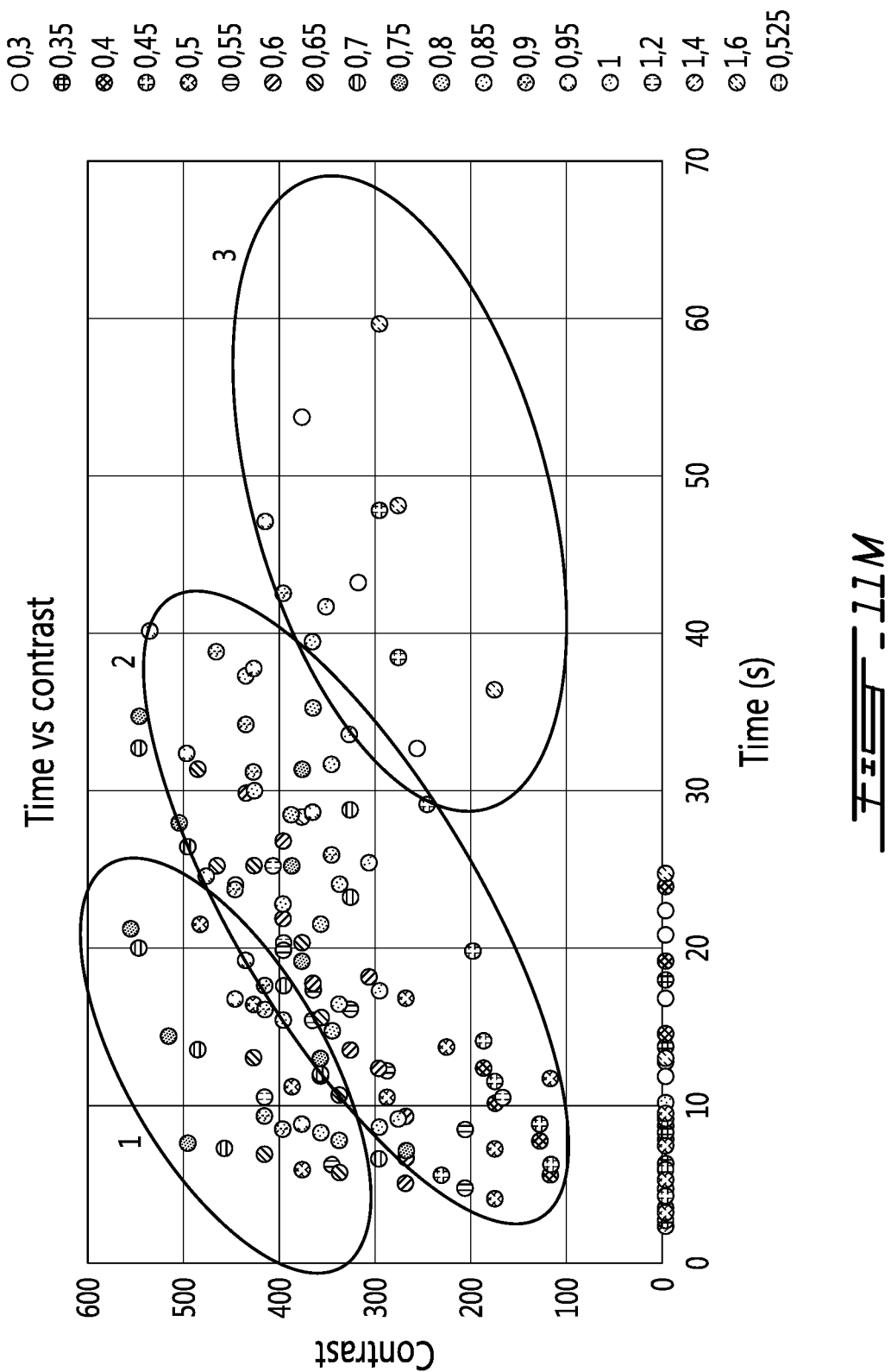
FIG. 11M is a graph showing contrast of the identifiers of FIGS. 11A-L as function of a laser-marking time, in accordance with some embodiments.

FIG. 11M depicts the relationship between the contrast and the time required for laser-marking, from which is can be understood that there is a compromise which can be achieved between marking time and contrast.

Three different sections were identified in the graph of FIG. 11M. Section 1 is considered ideal as the contrast insures a grade 4 per ISO 29158 in terms of contrast and can also be marked during a minimum time frame. Section 2 groups identifiers that either provide a grade 2 or 3 in a very short time frame or provide a grade 4 contrast value on a longer time frame. Section 3 groups identifiers which require a very long time to achieve a grade 3 or 4.

It was found that the relationship between the contrast CC and depth d can be mostly linear. It was expected that the deeper the recess of the dark cell, the darker it would appear thus giving a higher value of contrast. One important information to note is the significant increase in contrast between the first, second and third passes. Indeed, as the relationship between depth d and contrast is close to linear and the relationship between number of passes and depth d is not, a higher gain in contrast can be expected between passes 1 to 2 or 2 to 3 than compared to passes 3 to 4 or 4 to 5. A depth d between 0.3 mm and 0.4 would thus be expected to yield the satisfactorily high contrast.

The initial assumption in regards to aspect ratio was that the depth of the cell would greatly affect the final contrast in a linear fashion. It was expected that the slope characterizing the linear relationship between depth of the cell and contrast was very steep. However, since aspect ratio is defined as depth of the cell on its size and depth of the cell does not effect the contrast as much as the size of the cell, this slope, as discussed in the depth section, was pretty smooth. Thus, it can be a bit harder to give any indications in regards to aspect ratio. In fact, the higher values of contrast are concentrated in the 0.5 to 0.75 section but so is most of the data.

As can be understood, width w and time required for marking are relevant indicators of commercially satisfactory shot blast resistant identifiers. In fact, when taking into account the above tables, it is possible to get a range of satisfactory values, such as those listed above.

Figure 12B:
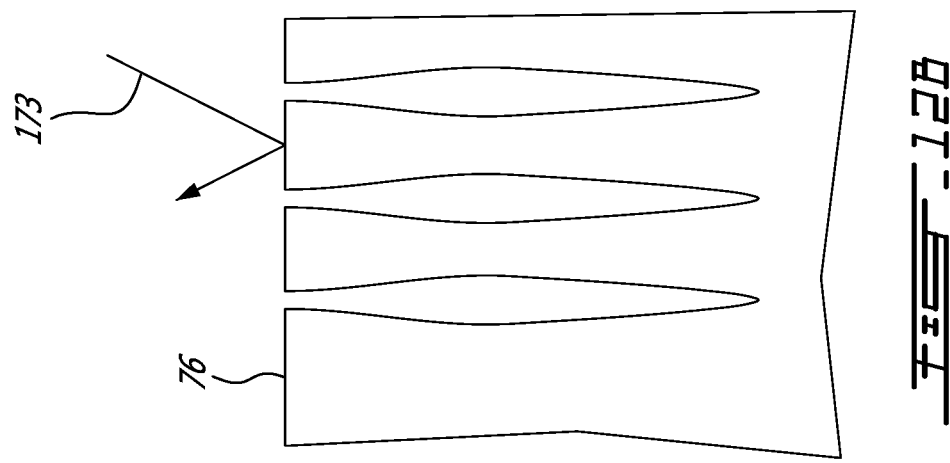
FIG. 12B is a sectional view of the dark cell of the identifier of FIG. 12A, shown after shot blasting, in accordance with one or more embodiments.
Figure 12A:
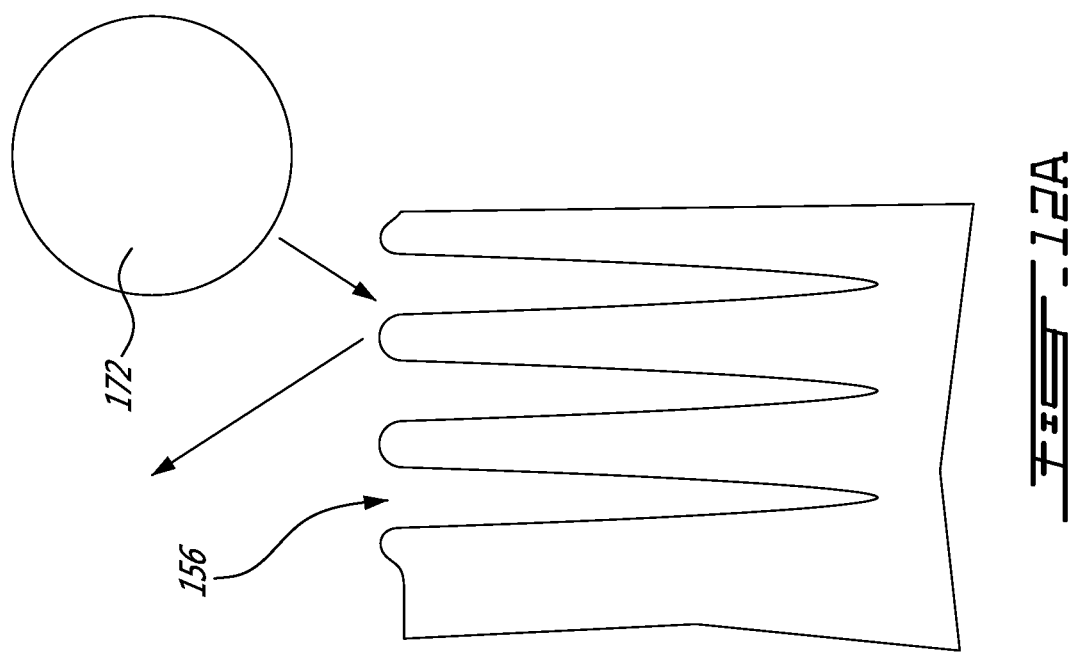
FIG. 12A is a sectional view of a dark cell of an identifier, showing a shot bounding on a top surface of a peripheral wall of a recess of the dark cell, in accordance with one or more embodiments.

As described with reference to FIG. 8A, having recesses which openings are too large allows shots to smooth a roughness of an inside surface of the dark cells. However, having recesses which openings are too narrow is to be avoided too. Indeed, as best illustrated in FIGS. 12A and 12B, a shot 172 directed at high velocity on such dark cells 156 could cause the peripheral walls to collapse, thus providing a relatively smooth surface 76 which would reflect light 173 instead of trapping it. Accordingly, the width w of the opening 166 of the recesses 162 is key in achieving shot blast resistant identifiers 150.

Examples of such identifiers being laser-marked on a metal casting are shown in FIG. 13. As can be seen, the dark cells do not appear dark as the peripheral walls of each dark cell have collapsed upon shot blasting, thus providing a relatively smoot surface 76 which reflect light, hence the bright appearance. In these examples, from identifiers G11-G32.

Referring back to FIGS. 9A and 9B, it is noted that the laser-marking of the dark cell 156 includes directing a focal spot 144 of the laser-marking beam along a raster path 178 encompassing the center portion of at least one of the dark cells 156. As shown, in contrast with typical laser-marking techniques which involve providing a line spacing which corresponds to a dimension of the focal spot, the inventors suggest using a raster path 178 defined by a line spacing s which is smaller than a dimension of the focal spot 144 of the laser-marking beam. Indeed, laser-removing the metal from the surface 142 of the metal casting 110 with such a small line spacing s can allow to better remove metal from the surface 142 and potentially even increase the roughness 168 of the inside surface 170 of the peripheral wall 164 of the resulting recess 162. The line spacing s can range between about 10 microns and 100 microns depending on the embodiment, and preferably be about 30 microns.

In this embodiment, only a portion of the raster path 178 associated to the dark cell is shown. Indeed, the raster path 178 can include a first series of passes along a given orientation to laser-mark all the center portions of the dark cells and a second series of passes along an orientation perpendicular to the given orientation to complete the laser-marker of all the center portions of the dark cells. In some embodiments, the laser-marking includes repeating said directing the focal spot 144 of the laser-marking beam along the raster path 178 a given number of times. For instance, at each additional time the directing is performed, the depth d of the recesses of the dark cells can become progressively deeper. However, it is understood that by increasing the number of times the directing of the focal spot 144 along the raster path is performed, the longer it can take for the identifier to be laser-marked. In alternate embodiments, the depth of the focal spot 144 can be progressively increased at each time the directing is performed.

In the above described embodiments, the opening 166 of the recesses 162 have a square shape 180. However, in some other embodiments, the opening 166 of the recesses 162 can have any other suitable shape. For instance, the shape can be circular such as shown in FIG. 14A, the shape can be triangular such as shown in FIG. 14B and the shape can be a rounded corner square such as shown in FIG. 14C. More specifically, the dark cell 156 of FIG. 14A has a peripheral wall 164 forming an opening 166 and recess 152 that are both circular, the dark cell 156 of FIG. 14B has a peripheral wall 164 forming an opening 166 and recess 162 that are both triangular, and the dark cell 156 of FIG. 14C has a peripheral wall 164 forming an opening 166 and recess 162 that are both rectangular.

Figure 15B:
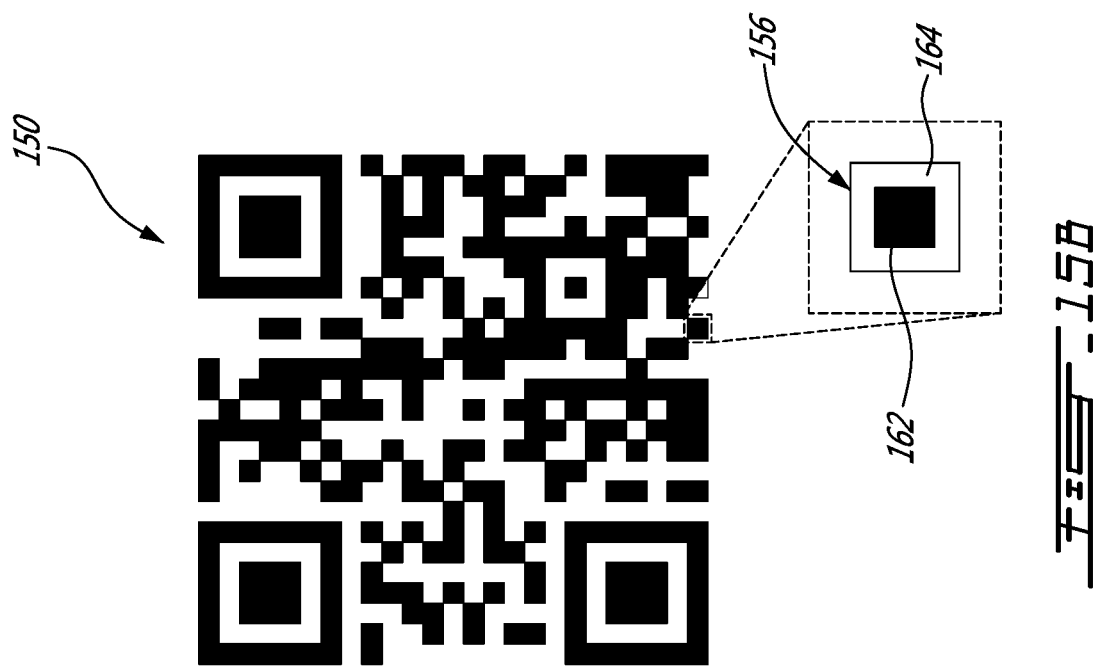
FIG. 15B is a schematic view of another example of a shot blast resistant identifier, shown as a quick response (QR) code, in accordance with one or more embodiments.
Figure 15A:
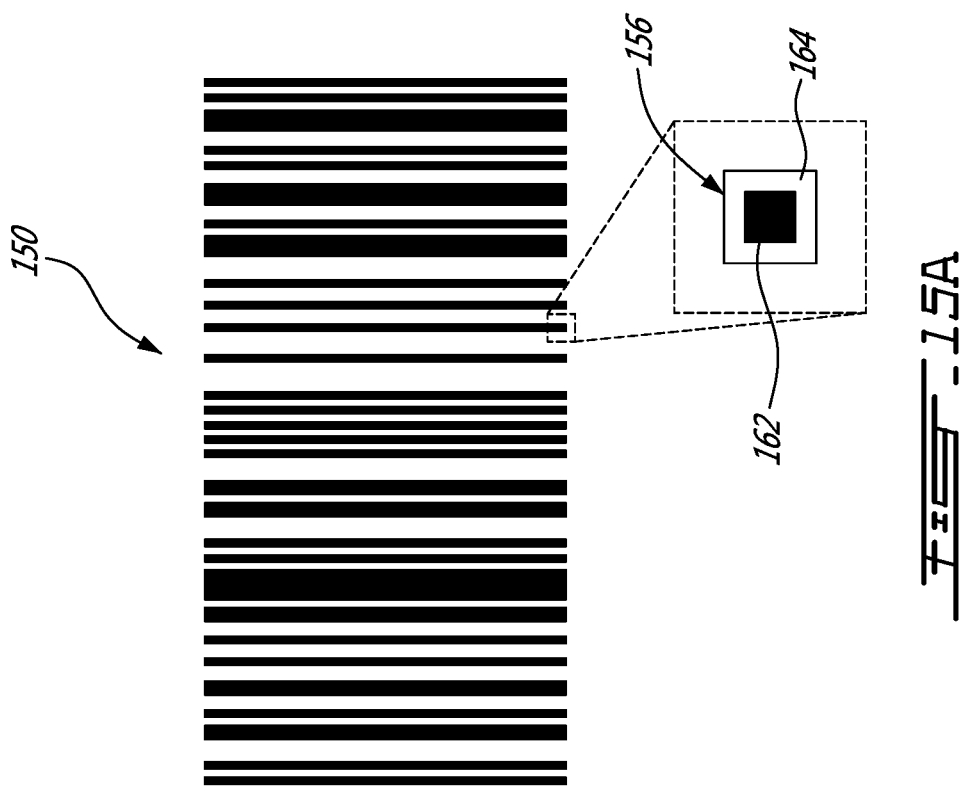
FIG. 15A is a schematic view of an example of a shot blast resistant identifier, shown as a bar code, in accordance with one or more embodiments.

As can be understood, although the shot blast resistant identifier 150 discussed above are provided in the form of data matrixes, the identifier 150 can be provided in the form of a bar code such as shown in FIG. 15A, in the form of a QR code such as shown in FIG. 15B, any suitable code bars or any one-dimensional (1D) or any suitable two-dimensional (2D) data code. In these examples, at least part or all of the dark features of the QR code or of the code bar are formed by one or more dark cells 156 having their respective peripheral walls 154 and corresponding recesses 162.

Figure 16:
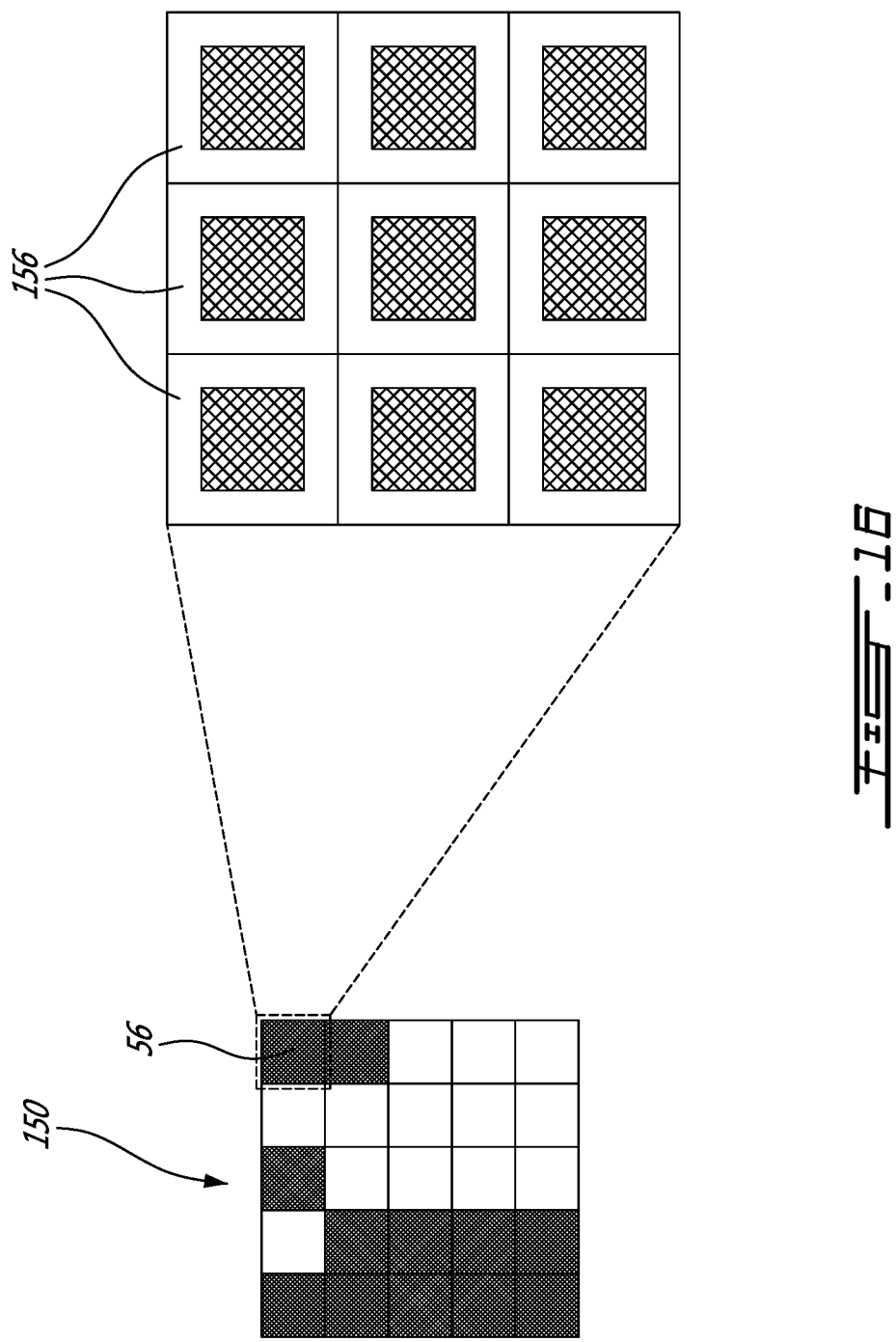
FIG. 16 is a schematic view of another example of a shot blast resistant identifier having bright cells and dark cells, showing that any one of such dark cells can include a plurality of smaller dark cells such as the one shown in FIG. 9A, in accordance with one or more embodiments.

As shown in FIG. 16, it is intended that a dark cell 56 of a larger identifier 150 can include a plurality of smaller dark cells 156 therein. However, as can be understood, the cell size c of the smaller dark cells, the width w of their openings, and the depth d of their recesses are selected in the satisfactory ranges described herein so as to provide a shot blast resistance to the larger identifier.

As briefly discussed above, it is know from previous studies that darkening of a metal surface under laser irradiation can be due to an increase of the local surface roughness in the dark area, such as discussed in Maltais, J., Brochu, V., Frayssinous, C., Vallée, R., Godmaire, X., Fraser, A. "Surface analysis study of laser marking of aluminum," ICSCOBA 2016, which is hereby incorporated by reference. More specifically, it is taught therein that bright areas can be laser marked on a surface by reducing its surface roughness thus causing a high level of diffuse reflection from the light. In contrary, dark areas on a surface can be laser marked on a surface by increasing its surface roughness thus causing a high level of absorption within the surface. By adjusting the laser parameters, bright and dark areas can be laser-marked upon demand.

During shot blasting, shots having a given diameter D are projected at high velocity against the identifier laser marked on the surface of the metal workpiece. Accordingly, a dark area having a higher surface roughness can migrate towards a bright area having a lower surface roughness upon impact of such shots. This flattening of the surface roughness can justify why the contrast between bright and dark cells tends to decrease after shot blasting in at least some circumstances.

Further analysis of the metal workpieces described above has led the inventors to better understand and characterize the requirements allowing a laser-marked identifier to be shot blast resistant. As shown in FIGS. 17A, 17B and 17C, the inventors noticed that the appearance of dark cells 156' changed as function of the size cell c. More specifically, shot-blasted dark cells 156' of FIG. 17A appear entirely dark whereas shot-blasted dark cells 156' of FIGS. 17B and 17C have a bright central region 184 surrounded by a dark periphery 186. However, even if these dark cells 156' had bright central regions 184 therein, it was found that these latter shot-blasted dark cells 156' could still appear dark to an optical reader, and thus provide satisfactory shot blast resistant laser-marked identifiers.

The inventors found that, for each dark cell 156 to be laser marked, the laser marking should remove metal from the surface 142 of the metal workpiece 110 only at a center portion 160 of the corresponding dark cell 156 thereby leaving a recess 162 bounded by a peripheral wall 164 in the corresponding dark cell 156. As such, the recess 162 is left with a bottom wall 188 having a width w at a depth d. Now, for shot blast resistant dark cells 156' to be obtained, it was found that each dark cell 156 should be left with a sufficient amount of dark area $A_{dark}$ which is defined as being unreachable by a shot having a diameter D. Moreover, it was found that a ratio R of the dark area $A_{dark}$ to a total area $A_{tot}$ of the bottom wall 188 should exceed about 50% to provide a shot blast resistance to the laser-marked identifier. In some embodiments, the ratio R exceeds about 60%, preferably about 70% and most preferably about 80%.

FIGS. 18A-18D show sectional views of shot-blasted dark cells 156' with different dimensions shown relatively to a shot of a diameter D. As shown, the dark cells 156' of FIGS. 18A and 18B have a depth d which is equal to or greater than half the diameter D of the shot 172 whereas the dark cells 156' of FIGS. 18C and 18D have a depth d which is smaller than half the diameter D of the shot 172.

Figure 18A:
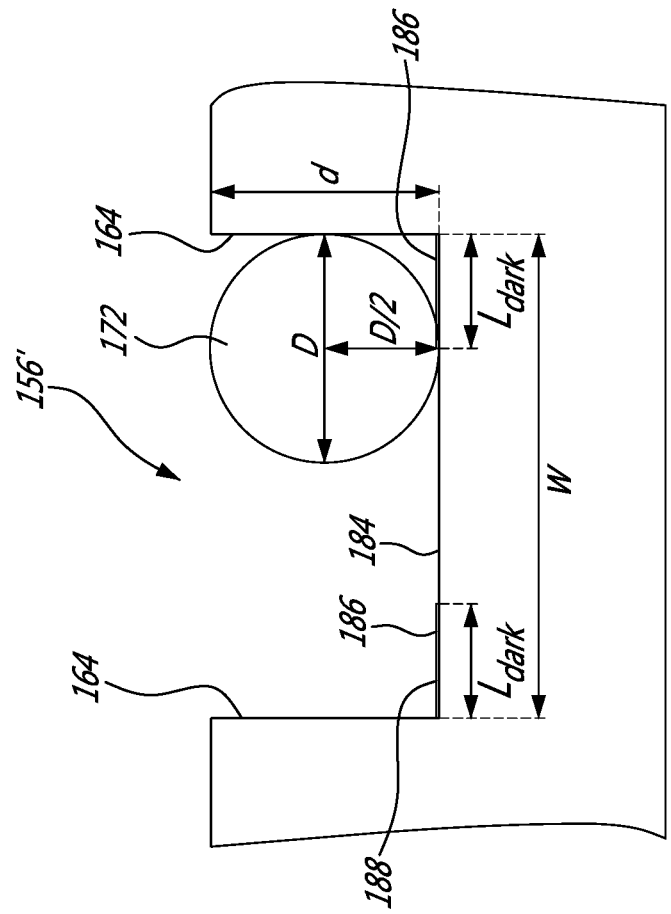
FIG. 18A is a sectional view of a dark cell having a recess of a width w being smaller than a diameter D of a shot and with a depth d being greater than half the diameter D of a shot, in accordance with one or more embodiments.

More specifically, In FIG. 18A, the width w is smaller than the diameter D of the shot 172. Accordingly, the shot 172 is prevented from reaching the dark area $A_{dark}$ of the bottom wall 188 so that the dark area $A_{dark}$ of the bottom wall 188 can remain dark even after shot blasting, given that the peripheral wall 164 of the dark cell 156' resist the mechanical deformation that could result from the shot blast. In a case where the dark cell 156' has a recess of a square shape of width w, such as shown in FIG. 19A, the dark area $A_{dark}$ corresponds to $L_{dark}^2$ (or equivalently to $w^2$) and the total area $A_{tot}$ of the bottom wall also corresponds to $L_{dark}^2$ (or equivalently to $w^2$) so that the ratio R is given by:

$$R = A_{dark}/A_{tot} = w^2/w^2 = 1, \tag{2}$$

satisfying the above-mentioned requirement for shot blast resistance.

Figure 18B:
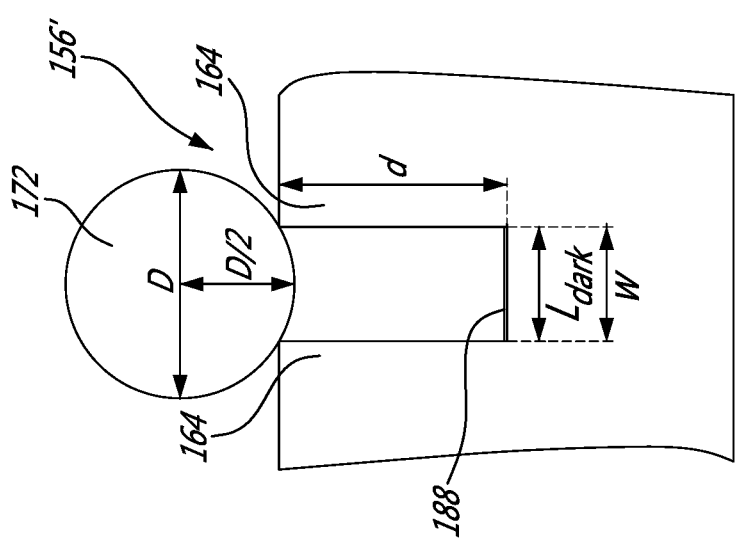
FIG. 18B is a sectional view of a dark cell having a recess of a width w being greater than a diameter D of a shot and with a depth d being greater than half the diameter D of a shot, in accordance with one or more embodiments.

Referring now to FIG. 18B, the width w is equal to or greater than the diameter D of the shot 172. Accordingly, the shot 172 can flatten the surface roughness of a central region of the bottom wall 188 so that it become a bright central region 184 during the shot blast (as shown in FIGS. 17B and 17C). In a case where the dark cell 156' has a recess of a square shape of width w, such as shown in FIG. 19B, the dark area $A_{dark}$ corresponds to $A_{dark}=A_{tot}-A_{bright}=w^2-(w-2L_{dark})^2$ and the total area $A_{tot}$ of the bottom wall 188 corresponds to $A_{tot}=w^2$. As can be appreciated from FIG. 18B, the dimension $L_{dark}$ can be correlated to half the diameter D of the shot (i.e., D/2) so that the ratio R is given by:

$$R = A_{dark}/A_{tot} = (w^2-(w-2L_{dark})^2)/w^2 = (w^2-(w-D)^2)/w^2, \tag{3}$$

Accordingly, in this embodiment, shot blast resistant identifier can be obtained when the width w satisfies the following inequality:

$$R \le \frac{w^2-(w-D)^2}{w^2}. \tag{4}$$

Figure 18D:
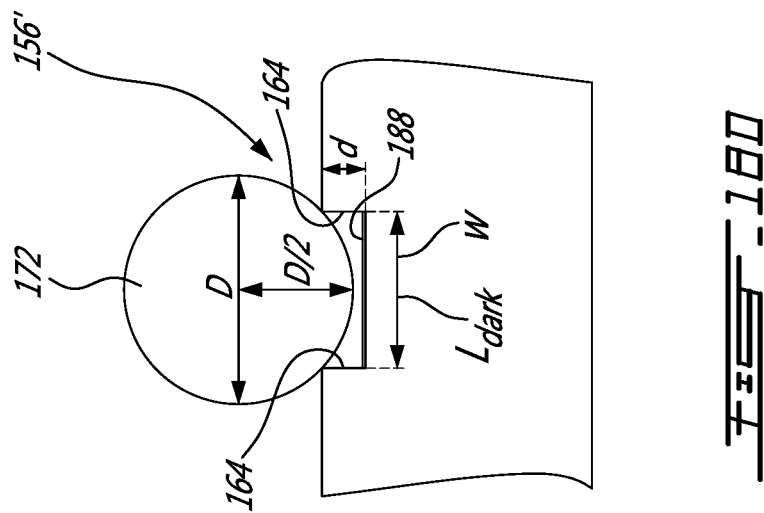
FIG. 18D is a sectional view of a dark cell having a recess of a width w being smaller than $2\sqrt{Dd-d^2}$ and with a depth d being smaller than half the diameter D of a shot, in accordance with one or more embodiments.
Figure 18C:
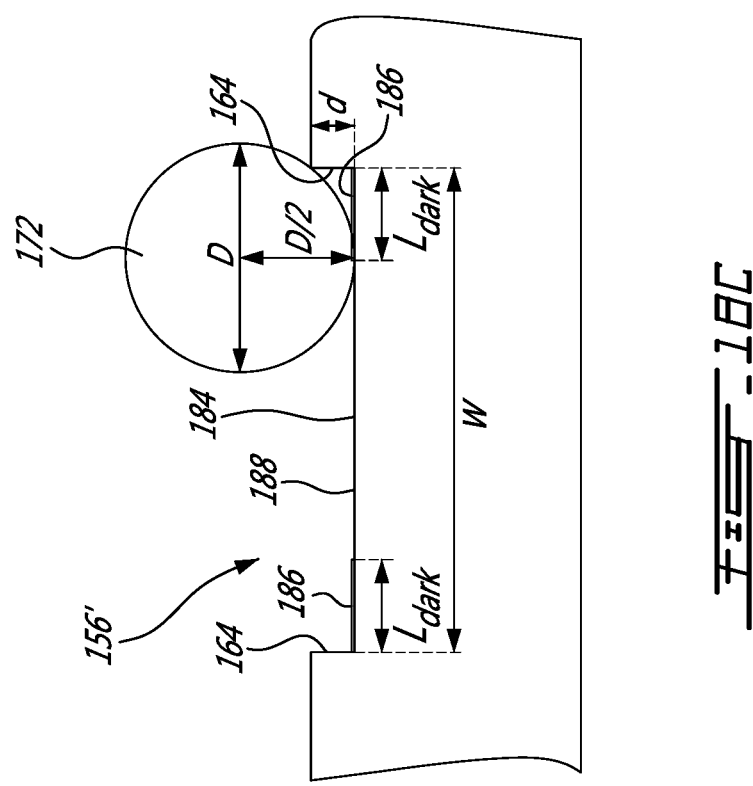
FIG. 18C is a sectional view of a dark cell having a recess of a width w being greater than $2\sqrt{Dd-d^2}$ and with a depth d being smaller than half the diameter D of a shot, in accordance with one or more embodiments.

In FIG. 18C, the dimension $L_{dark}$ corresponds to $\sqrt{Dd-d^2}$, as can be derived trivially using the circle equation. Accordingly, in order for a bright central region 184' to appear, the width w of the recess of the dark cell 156' is equal or greater than two times the dimension $L_{dark}$, i.e., $2\sqrt{Dd-d^2}$. Similarly to the embodiment of FIG. 18B, the shot 172 can flatten the surface roughness of a central region of the bottom wall 188 so that it become a bright central region 184 during the shot blast (as shown in FIGS. 17B and 17C). In a case where the dark cell 156' has a recess of a square shape of width w, such as shown in FIG. 19B, the dark area $A_{dark}$ corresponds to $A_{dark}=A_{tot}-A_{bright}=w^2-(w-2L_{dark})^2$ and the total area $A_{tot}$ of the bottom wall 188 corresponds to $A_{tot}=w^2$. As can be appreciated from FIG. 18B, the dimension $L_{dark}$ can be correlated to $\sqrt{Dd-d^2}$ so that the ratio R be given by:

$$R = A_{dark}/A_{tot} = (w^2-(w-2L_{dark})^2)/w^2 = (w^2-(w-2\sqrt{Dd-d^2})^2)/w^2, \tag{5}$$

Accordingly, in this embodiment, shot blast resistant identifier can be obtained when the width w and the depth d collectively satisfy the following inequality:

$$R \le \frac{w^2-\left(w-2\sqrt{Dd-d^2}\right)^2}{w^2}, \tag{6}$$

Referring now to FIG. 18D, the width w is equal or greater than two times the dimension $L_{dark}$. Accordingly, the shot 172 is prevented from reaching the dark area $A_{dark}$ of the bottom wall 188 so that the dark area $A_{dark}$ of the bottom wall 188 can remain dark even after shot blasting, given that the peripheral wall 164 of the dark cell 156' resist the mechanical deformation that could result from the shot blast. In a case where the dark cell 156' has a recess of a square shape of width w, such as shown in FIG. 19A, the dark area $A_{dark}$ corresponds to $L_{dark}^2$ (or to $w^2$) and the total area $A_{tot}$ of the bottom wall corresponds to $L_{dark}^2$ (or to $w^2$) so that the ratio R is given by:

$$R = A_{dark}/A_{tot} = w^2/w^2 = 1, \tag{7}$$

satisfying the above-mentioned requirement for shot blast resistance.

Further tests have been performed and the following combinations of dimensions have been found to be satisfactory, in at least some situations. However, as can be understood, other combinations of parameters could also provide satisfactory results.

Although the embodiments presented above involve cells having a square shape, the cells could have any other suitable shape including, but not limited to, a circular shape, a triangular shape, and the like.

TABLE 4

Parameters used by the controller to laser-mark the identifiers to obtain predetermined ratios R Depth d (see values in mm)

| R | Recess width w (see values in μm) | | | | | | |
|---|---|---|---|---|---|---|---|
|  | 400 μm | 500 μm | 600 μm | 700 μm | 800 μm | 900 μm | 1000 μm |
| 0.5 | 0.008 mm | 0.013 mm | 0.019 mm | 0.026 mm | 0.035 mm | 0.045 mm | 0.057 mm |
| 0.55 | 0.010 mm | 0.016 mm | 0.024 mm | 0.033 mm | 0.045 mm | 0.059 mm | 0.077 mm |
| 0.6 | 0.013 mm | 0.021 mm | 0.030 mm | 0.043 mm | 0.058 mm | 0.078 mm | 0.103 mm |
| 0.65 | 0.016 mm | 0.026 mm | 0.038 mm | 0.054 mm | 0.075 mm | 0.103 mm | 0.148 mm |

For shots having an average diameter D of 430 μm

See Annex A attached to this disclosure for more detail. It will be appreciated that the cell size $S_C$ described in Annex A differs from the cell size c used herein. More specifically, the cell size $S_C$ described in Annex A corresponds to the width w as defined herein.

As can be understood, the examples described above and illustrated are intended to be exemplary only. For instance, although the figures have been described with reference to methods and systems for laser-marking shot-blast resistant identifiers on a metal casting, it will be understood that the methods and systems described herein can be used to laser-mark shot-blast resistant identifiers on any type of metal workpieces including, but not limited to, metal castings produced in a workpiece production station by any suitable casting technique (e.g., die-casting, sand casting, plaster mold casting, shell molding, investment casting, waste molding of plaster, evaporative-pattern casting, lost-foam casting, full-mold casting, non-expandable mold casting, permanent mold casting, semi-solid metal casting, continuous casting), metal forgings produced by any suitable forging technique (e.g., temperature forging, drop forging, open-die drop forging, impression-die forging, press forging, upset forging, automatic hot forging, roll forging, net-shape and near-net-shape forging, cold forging, induction forging, multidirectional forging, isothermal forging), a combination thereof and/or any other suitable metal workpiece production technique. Also, the expression center portion is meant to be construed in a broad manner which would encompass situations where the center portion is not located at the exact center of the corresponding cell. In view of the examples provided above, the inventors believe that although a finite number of combinations of cell sizes c, recess depths d, and opening widths w, and ratios R have been tested with satisfactory results, i.e., in a manner which provide shot blast resistant identifiers, other combinations that may appear to the person skilled in the art are meant to be encompassed by the present application. Indeed, the inventors believe that as soon as a dark cell is laser-marked in a manner which provides a sufficient amount of dark area relative to the bright area, the corresponding dark cell can be deemed to bear a shot blast resistance, as supported by the experimental results described herein. The scope is indicated by the appended claims.

What is claimed is:

1. A method of laser-marking an identifier on a metal workpiece along a production line, wherein the method comprises:
   receiving the metal workpiece along the production line;
   obtaining identifier data indicative of the identifier to be laser-marked on the metal workpiece, the identifier having a plurality of cells each having a corresponding cell width, the plurality of cells having a plurality of bright cells corresponding to a first binary value and a plurality of dark cells corresponding to a second binary value; and
   based on the identifier data, laser-marking the identifier on a surface of the metal workpiece by laser-removing, for each one of the plurality of dark cells, metal from the surface of the metal workpiece only at a center portion of the corresponding dark cell thereby leaving a recess bounded by a peripheral wall in the corresponding dark cell, the recess having a depth of at least 100 microns and having an opening with a width ranging between 400 microns and 1750 microns, the width of the recess representing between 30 percent and 99 percent of the corresponding cell width such that the corresponding dark cell appears dark to an optical reader.

2. The method of claim 1 further comprising, after said laser-marking, shot blasting the metal workpiece including shot blasting the identifier.

3. The method of claim 2 further comprising, after said laser-marking and said shot blasting, reading the identifier using the optical reader, and tracking the metal workpiece based on said reading.

4. The method of claim 1 wherein the bright cells have a texture indicating that the metal workpiece has been previously shot blasted, the identifier being readable by the optical reader.

5. The method of claim 1 wherein the depth of the recess is at least 150 microns.

6. The method of claim 1 wherein the depth of the recess is at least 300 microns.

7. The method of claim 1 wherein the width of the opening ranges between 60 percent and 95 percent of the corresponding cell width.

8. The method of claim 1 wherein the width of the opening ranges between 70 percent and 89 percent of the corresponding cell width.

9. The method of claim 1 wherein an aspect ratio of the depth relative to the width ranges between 0.2 and 2.

10. The method of claim 9 wherein the aspect ratio ranges between 0.3 and 1.5.

11. The method of claim 1 wherein the width of the opening ranges between 600 microns and 850 microns.

12. The method of claim 1 wherein the identifier is provided in the form of a data matrix.

13. The method of claim 1 wherein the opening has a rectangular shape.

14. The method of claim 1 wherein the metal workpiece has aluminum.

* * * * *